US012177343B2

(12) United States Patent
Patel et al.

(10) Patent No.: US 12,177,343 B2
(45) Date of Patent: Dec. 24, 2024

(54) METHODS AND APPARATUSES TO PROVIDE CHIPLET BINDING TO A SYSTEM ON A CHIP PLATFORM HAVING A DISAGGREGATED ARCHITECTURE

(71) Applicant: Intel Corporation, Santa Clara, CA (US)

(72) Inventors: Baiju Patel, Portland, OR (US); Siddhartha Chhabra, Portland, OR (US); Prashant Dewan, Portland, OR (US); Ofir Shwartz, Haifa (IL)

(73) Assignee: Intel Corporation, Santa Clara, CA (US)

( * ) Notice: Subject to any disclaimer, the term of this patent is extended or adjusted under 35 U.S.C. 154(b) by 671 days.

(21) Appl. No.: 17/358,952

(22) Filed: Jun. 25, 2021

(65) Prior Publication Data
US 2022/0417005 A1    Dec. 29, 2022

(51) Int. Cl.
*H04L 9/08*    (2006.01)
(52) U.S. Cl.
CPC .................... *H04L 9/088* (2013.01)
(58) Field of Classification Search
CPC ......................................... H04L 9/088
See application file for complete search history.

(56) References Cited

U.S. PATENT DOCUMENTS

| | | | |
|---|---|---|---|
| 10,795,853 B2 | 10/2020 | Nassif et al. | |
| 2012/0195426 A1* | 8/2012 | White | G09G 3/2085 380/210 |
| 2014/0122881 A1* | 5/2014 | Cizas | G06F 21/445 713/169 |
| 2018/0262353 A1* | 9/2018 | Riou | H01L 23/57 |
| 2019/0229901 A1* | 7/2019 | Elbaz | H04L 9/14 |
| 2019/0306134 A1* | 10/2019 | Shanbhogue | H04L 63/123 |
| 2020/0311291 A1* | 10/2020 | Troia | G06F 21/64 |
| 2020/0328192 A1* | 10/2020 | Zaman | H01L 25/0657 |
| 2020/0395316 A1* | 12/2020 | Cok | H01L 21/6835 |
| 2021/0117247 A1* | 4/2021 | Panneer | H04L 9/0897 |
| 2022/0121483 A1* | 4/2022 | Baronne | G06F 9/50 |

* cited by examiner

*Primary Examiner* — Techane Gergiso
(74) *Attorney, Agent, or Firm* — NICHOLSON DE VOS WEBSTER & ELLIOTT LLP

(57) ABSTRACT

Systems, methods, and apparatuses for providing chiplet binding to a disaggregated architecture for a system on a chip are described. In one embodiment, system includes a plurality of physically separate dies, an interconnect to electrically couple the plurality of physically separate dies together, a first die-to-die communication circuit, of a first die of the plurality of physically separate dies, comprising a transmitter circuit and an encryption circuit having a link key to encrypt data to be sent from the transmitter circuit into encrypted data, and a second die-to-die communication circuit, of a second die of the plurality of physically separate dies, comprising a receiver circuit and a decryption circuit having the link key to decrypt the encrypted data sent from the transmitter circuit to the receiver circuit.

24 Claims, 20 Drawing Sheets

800

```
┌─────────────────────────────────────────────────────────────────────┐
│ ELECTRICALLY COUPLING A PLURALITY OF PHYSICALLY SEPARATE DIES       │
│ TOGETHER WITH AN INTERCONNECT INTO A SYSTEM                         │
│                              802                                     │
└─────────────────────────────────────────────────────────────────────┘
                                 │
                                 ▼
┌─────────────────────────────────────────────────────────────────────┐
│ STORING (E.G., ONLY AT MANUFACTURING TIME) A LINK KEY INTO A FIRST  │
│ DIE-TO-DIE COMMUNICATION CIRCUIT, OF A FIRST DIE OF THE PLURALITY   │
│ OF PHYSICALLY SEPARATE DIES, COMPRISING A TRANSMITTER CIRCUIT AND   │
│ AN ENCRYPTION CIRCUIT USING THE LINK KEY TO ENCRYPT DATA TO BE      │
│ SENT FROM THE TRANSMITTER CIRCUIT INTO ENCRYPTED DATA               │
│                              804                                     │
└─────────────────────────────────────────────────────────────────────┘
                                 │
                                 ▼
┌─────────────────────────────────────────────────────────────────────┐
│ STORING (E.G., ONLY AT MANUFACTURING TIME) THE LINK KEY INTO A      │
│ SECOND DIE-TO-DIE COMMUNICATION CIRCUIT, OF A SECOND DIE OF THE     │
│ PLURALITY OF PHYSICALLY SEPARATE DIES, COMPRISING A RECEIVER        │
│ CIRCUIT AND A DECRYPTION CIRCUIT USING THE LINK KEY TO DECRYPT THE  │
│ ENCRYPTED DATA SENT FROM THE TRANSMITTER CIRCUIT TO THE RECEIVER    │
│ CIRCUIT                                                              │
│                              806                                     │
└─────────────────────────────────────────────────────────────────────┘
```

FIG. 8

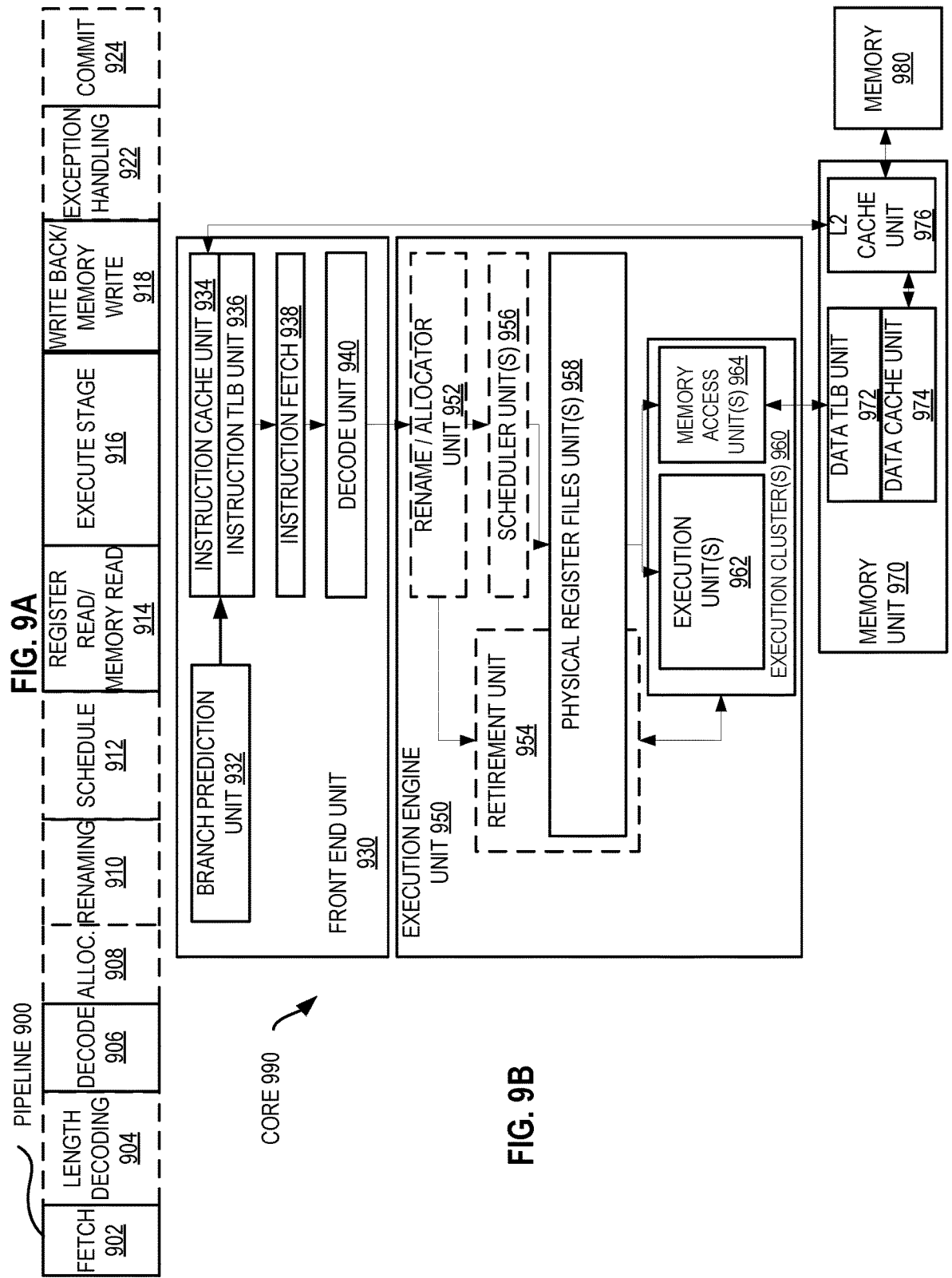

METHODS AND APPARATUSES TO PROVIDE CHIPLET BINDING TO A SYSTEM ON A CHIP PLATFORM HAVING A DISAGGREGATED ARCHITECTURE

TECHNICAL FIELD

The disclosure relates generally to electronics, and, more specifically, an embodiment of the disclosure relates to circuitry to provide chiplet binding to a disaggregated architecture for a system on a chip (SoC).

BACKGROUND

A processor, or set of processors, executes instructions from an instruction set, e.g., the instruction set architecture (ISA). The instruction set is the part of the computer architecture related to programming, and generally includes the native data types, instructions, register architecture, addressing modes, memory architecture, interrupt and exception handling, and external input and output (I/O). It should be noted that the term instruction herein may refer to a macro-instruction, e.g., an instruction that is provided to the processor for execution, or to a micro-instruction, e.g., an instruction that results from a processor's decoder decoding macro-instructions.

BRIEF DESCRIPTION OF THE DRAWINGS

The present disclosure is illustrated by way of example and not limitation in the figures of the accompanying drawings, in which like references indicate similar elements and in which:

FIG. 8 is a flow diagram illustrating operations for enabling die binding in a system having a disaggregated architecture according to embodiments of the disclosure.

FIG. 9A is a block diagram illustrating both an exemplary in-order pipeline and an exemplary register renaming, out-of-order issue/execution pipeline according to embodiments of the disclosure.

FIG. 9B is a block diagram illustrating both an exemplary embodiment of an in-order architecture core and an exemplary register renaming, out-of-order issue/execution architecture core to be included in a processor according to embodiments of the disclosure.

DETAILED DESCRIPTION

Figure 1:
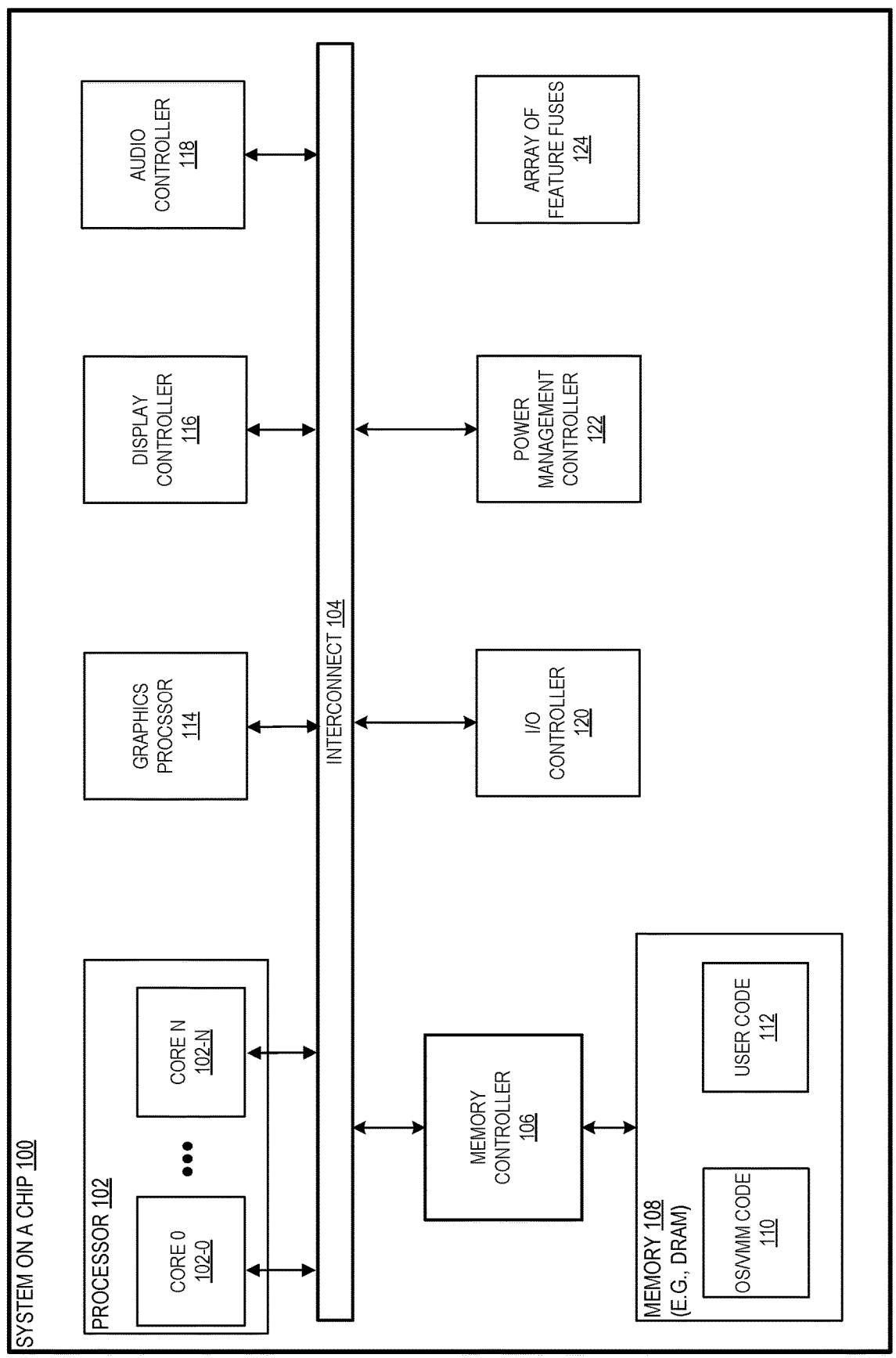
FIG. 1 illustrates a system on a chip (SoC) according to embodiments of the disclosure.

In the following description, numerous specific details are set forth. However, it is understood that embodiments of the disclosure may be practiced without these specific details. In other instances, well-known circuits, structures, and techniques have not been shown in detail in order not to obscure the understanding of this description.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

A (e.g., hardware) processor (e.g., having one or more cores) may execute (e.g., user-level) instructions (e.g., a thread of instructions) to operate on data, for example, to perform arithmetic, logic, or other functions. For example, software may include a plurality of instructions (e.g., macro-instructions) that are provided to a processor (e.g., a core or cores thereof) that then executes (e.g., decodes and executes) the plurality of instructions to perform the corresponding operations. In certain embodiments, a processor includes circuitry (e.g., one or more decoder circuits) to translate (e.g., decode) an instruction into one or more micro-operations (μops or micro-ops), for example, with these micro-operations directly executed by the hardware (e.g., by execution circuits), e.g., and then the macro-operation retired once the micro-operation(s) are complete. One or more micro-operations corresponding to an instruction (e.g., macro-instruction) may be referred to as a microcode flow for that instruction. A micro-operation may be referred to as a micro-instruction, for example, a micro-instruction that resulted from a processor's decoding of a macro-instruction. In one embodiment, the instructions are 64 bit and/or 32 bit instructions of an instruction set architecture (ISA). In one embodiment, the instructions are (e.g., 64 bit and/or 32 bit) instructions of an Intel® instruction set architecture (ISA).

In certain embodiments, a system is formed from a plurality of dies, e.g., each are produced separately and then packaged together. For example, instead of a system being formed on a single die, e.g., a single (e.g., semiconductor) block of integrated circuits. In one embodiment, a single die may have (e.g., manufacturing) errors or defects that impede or remove certain functionality of the die. This liability to process defect may increase with the die area, as does the fabrication investment at risk of loss in construction of (e.g., large) systems.

In certain embodiments, a system is formed from multiple chips and feature controllers for peripherals, e.g., keyboard, mouse, and/or display. In certain embodiment, an SoC integrates a plurality of (e.g., all of) these components (e.g., chipset features) into a single semiconductor (e.g., silicon) chip (e.g., made of a plurality of chiplets). In one embodiment, an SoC includes a processor, a graphics processor (e.g., graphics processing unit (GPU)), memory, peripheral controller (e.g., according to a Universal Serial Bus (USB) standard), power management circuit, and/or wireless radio(s). The design of these components may be from different vendors, e.g., different entities and/or foundries. In certain embodiments, a system (e.g., SoC) includes one or more (e.g., pre-designed) circuit blocks, e.g., one for each component. These circuit blocks may each be (as referred to in hardware design lexicon as) an intellectual property (IP) core (or IP block), for example, a reusable block of logic, cell, or integrated circuit layout design that is the intellectual property of one party. IP cores can be licensed to another party (e.g., vendor) or owned and used by a single party. A circuit block may operate according to a respective standard for that type of block. Each circuit block may have its own design (e.g., digital) file. In certain embodiments, a system (e.g., SoC) design thus includes multiple circuit blocks (e.g., from various designers and/or vendors). For example, in one embodiment, an SoC includes multiple chiplets, e.g., that each include (e.g., millions of) gates/transistors and/or each chiplet on a single die.

Certain embodiments herein provide for multiple physically separate (e.g., discrete) dies to be (e.g., electrically) connected together by an interconnect to form a processor. For example, a system (e.g., SoC) vendor may use a design where instead of having one monolithic die performing multiple functions, multiple chiplets (e.g., each chiplet being a respective, single die) are combined to form one chip. In one embodiment, a system includes a processor (e.g., central processing unit (CPU)) chiplet, a graphics chiplet, a SoC chiplet, and an input/output (I/O) chiplet, e.g., and those separate chiplets communicate over die-to-die links, such as, but not limited to, a communication circuit that operates according to a Peripheral Component Interconnect Express (PCIE) standard, three-dimensional standard (e.g., Foveros), Compute Express Link (CXL) standard, Embedded Multi-Die Interconnect Bridge (EMIB) standard, Ultra Path Interconnect (UPI) standard, etc.

A disaggregated chip design provides additional agility and flexibility in terms of creating certain products, e.g., it lets design houses choose foundries, combine certain (e.g., older) chiplets with other (e.g., newer) chiplets, and/or allows the making of new products by using different chiplets instead of duplicating (e.g., and revalidating) functionality in multiple chips. As an example, different systems (e.g., which may be referred to as stock keeping units (SKUs)) can be created on the capability of the graphics die or CPU die, or both. Additionally, it allows design houses to manufacture smaller dies which are likely to have better yields and allow a manufacturer to phase in new manufacturing processes. As an example, a product does not have to go the same technology node for all chiplets. It can be phased in over time. Such a disaggregated architecture also enables a model where some dies can be manufactured by third party foundries (e.g., separate from a foundry manufacturing a CPU die).

In addition to the flexibility, cost benefits, yield, and eventually time to market benefits, such a design has some additional security challenges in certain embodiments. As an example, the die-to-die link may be probed by a motivated adversary and may be vulnerable to active and/or passive physical attacks. Additionally, if multiple dies need some secure logic, there can be logic redundancy with the same logic implemented in each of the dies in certain embodiments.

Embodiments herein are directed to a tightly coupled secure die (e.g., chiplet) architecture where different dies can communicate with each other over cryptographically protected links which serves to secure the die-to-die communication, e.g., and enables a design where common logic does not need to be duplicated in multiple dies. Embodiments herein ensure that the dies (e.g., chiplets) are bound to the part (e.g., SoC) and cannot be replaced in the field. Embodiments herein provide robust and secure disaggregated designs. Embodiments herein provide secure data transmission across unsecure links within a package, ensure that the secrets embedded in the chip are not readable by a third-party foundry, provide resilience against a splicing of a (e.g., malicious) chiplet into a genuine package (e.g., the set of chiplets that were intended to be used in the package), and provide a mechanism (e.g., to software) to ensure that code is executing on a genuine package.

In one embodiment, a system uses physically unclonable function (PUF) based mechanisms for protecting secrets in chips, e.g., to protect keys but are not used to secure the data transmission across links or provide resilience against malicious chiplet(s). Embodiments herein provide secure data transmission across links between dies (e.g., chiplets) and provide resilience against malicious chiplet(s).

System design may include the generation of a netlist, e.g., that describes the connectivity of the electronic circuit(s), e.g., the dies used in a system (e.g., the chiplets used in a SoC). In one embodiment, a netlist consists of a list of the electronic components in a circuit and a list of the nodes they are connected to. In certain embodiments, e.g., (during netlist generation), a random number is generated and programmed in the netlist. In certain embodiments, each die (e.g., chiplet) includes circuitry (e.g., a die-to-die communication circuit) that provides: (i) an encryption engine which encrypts (and/or decrypts) (and optionally integrity protects) messages going out of the chiplet, and/or (ii) a key derivation function (KDF) that derives a secret based on the random number programmed in the netlist into a die identification (ID) value for a die, e.g., a chiplet ID value for a chiplet. In certain embodiments (e.g., for SoC data), the receiving chiplet uses the cryptographic engine in its circuitry to decrypt the message (and optionally checks the integrity of the message by verifying the tag (e.g., message authentication code (MAC)). Embodiments herein provide varying security guarantees as discussed below. In certain embodiment, cryptographically protected die-to-die communication circuits allow for access to logic circuitry in one die by multiple dies, e.g., without duplication of that logic circuitry in multiple dies (e.g., in each die). For example, without duplication of a fuse controller and/or a debug controller.

In certain embodiments, for a die (e.g., chiplet) ID request, the die-to-die communication circuit (e.g., KDF circuitry thereof) generates a die (e.g., chiplet) ID, e.g., and sends it through an unencrypted channel set by the cryptographic engine. In certain embodiments, all the die IDs (e.g., chiplet IDs) are combined (e.g., by the CPU chiplet) to form a single system ID (e.g., chip ID). In one embodiment, the die IDs (e.g., chiplet IDs) are concatenated together to form a single key (e.g., Key=ChipletID1|ChipletID2|Chiplet ID3 . . . ), and that single key is used to generate a single system ID (e.g., SoC chip ID), for example, by performing a cryptographic hash (e.g., hash-based message authentication code (HMAC) on the single key and another value (e.g., nonce), for example, ChipID=HMAC(Key, nonce)). The another value (e.g., nonce) may be provided by software, e.g., manufacturing software but not known to an end user or the like. In certain embodiments (e.g., to manage privacy concerns) this system ID (e.g., chip ID) is only accessible during (e.g., platform or system) manufacturing and made inaccessible at the end of the manufacturing. In one embodiment, the mechanism of disabling the accessibility of the system ID (e.g., chip ID) post manufacturing is by fuses (e.g., programmable fuses).

In certain embodiments herein, dies (e.g., chiplets) are cryptographically bound together, for example, such that if an adversary with hardware access tries to replace a die (e.g., chiplet) with a malicious die (e.g., chiplet) in order to access the secrets of the part, then the attempt will be detected as messages sent to and from the malicious chiplet will fail integrity checks. Embodiments herein enable protection of communication between dies (e.g., chiplets), e.g., providing a secure disaggregated architecture.

FIG. 1 illustrates a system on a chip (SoC) 100 according to embodiments of the disclosure. In certain embodiments, the design of such a SoC 100 includes multiple dies (e.g., dies), e.g., from multiple vendors. For example, a proper subset (e.g., each) of the components may be designed by a different vendor. In certain embodiments, SoC 100 includes one or more of a processor 102 (having one or more of cores 102-0 to 102-N, where N is any positive integer greater than one), an interconnect (or bus) 104 between the components to allow communication therebetween, a memory controller 106, a memory 108, a graphics processor 114, a display controller 116, an audio controller 118, and input/output (e.g., peripherals) controller 120, a power management controller 122, and an array of feature fuses 124 (e.g., set according to the disclosure herein). Memory 108 may include operating system (OS) and/or virtual machine monitor code 110 and user (e.g., program) code 112. Memory 108 may be memory separate from a core's memory (e.g., core's cache). Memory 108 may be DRAM.

Processor 102 may include hardware initialization manager (non-transitory) storage that stores hardware initialization manager firmware (e.g., or software). In one embodiment, the hardware initialization manager (non-transitory) storage stores Basic Input/Output System (BIOS) firmware. In another embodiment, the hardware initialization manager (non-transitory) storage stores Unified Extensible Firmware Interface (UEFI) firmware. In certain embodiments (e.g., triggered by the power-on or reboot of a processor), SoC 100 (e.g., core 102-0 thereof) executes the hardware initialization manager firmware (e.g., or software) stored in hardware initialization manager (non-transitory) storage to initialize the SoC 100 for operation, for example, to begin executing an operating system (OS) and/or initialize and test the (e.g., hardware) components of SoC. SoC may include one more of components in FIG. 15.

Figure 2A:
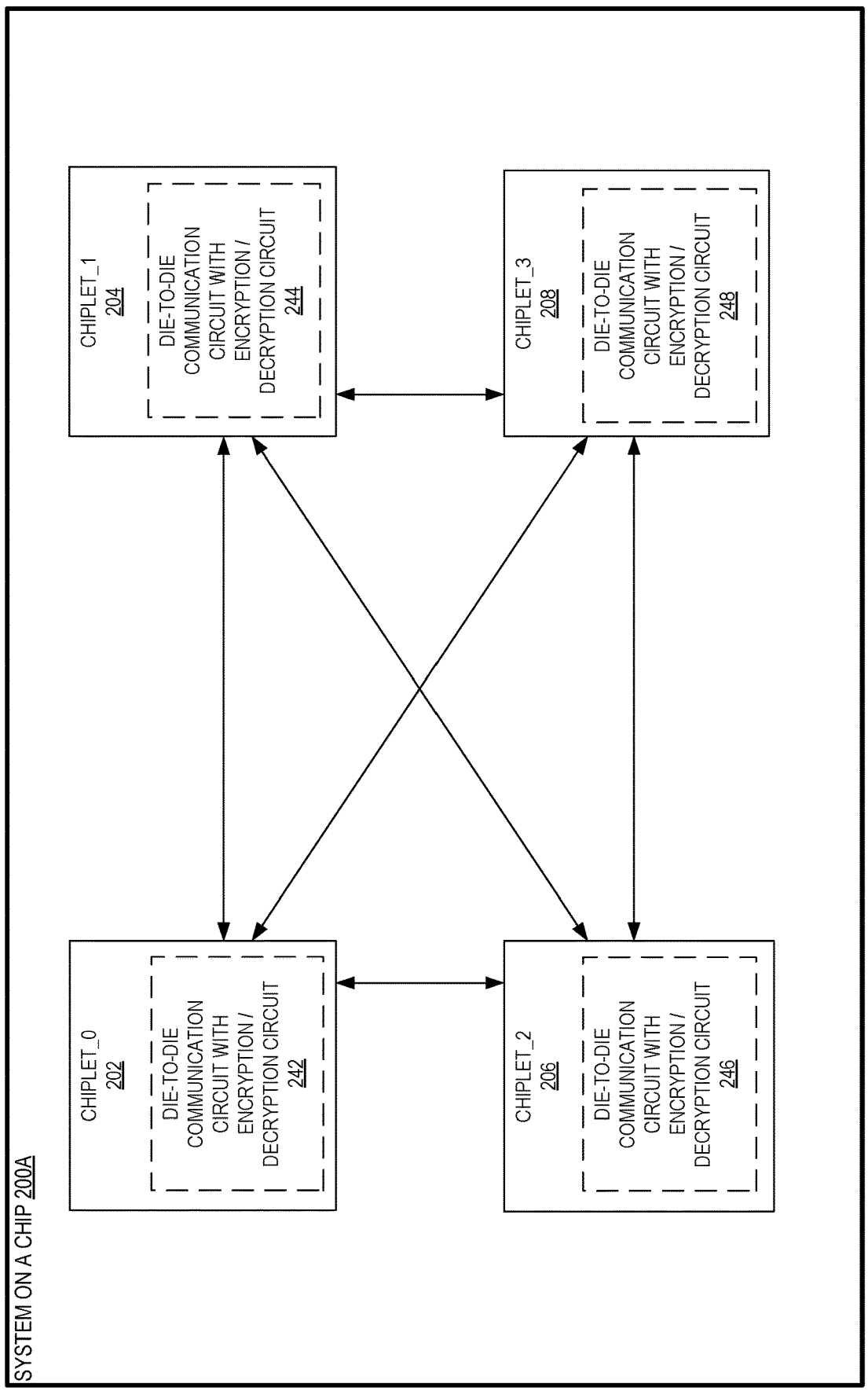
FIG. 2A illustrates a system on a chip (SoC) having a plurality of interconnected chiplets according to embodiments of the disclosure.

FIG. 2A illustrates a system on a chip (SoC) 200A having a plurality of interconnected chiplets 202, 204, 206, and 208 according to embodiments of the disclosure. FIG. 2A includes a plurality of couplings (e.g., die-to-die links each depicted as an arrow) forming an interconnect between the chiplets. One or more of the chiplets may include a die-to-die communication circuit, e.g., to manage the communications to and/or from a die. For example, with chiplet 202 including die-to-die communication circuit 242, chiplet 204 including die-to-die communication circuit 244, chiplet 206 including die-to-die communication circuit 246, and chiplet 208 including die-to-die communication circuit 248. In one embodiment, a die (e.g., chiplet) includes a processor, e.g., processor 102 in FIG. 1.

Each chiplet is connected to other chiplets in the system using D2D links. In certain embodiments, from a security standpoint, it is assumed that the links can be probed by a sophisticated hardware adversary and thus allowing secrets flowing over the links can hence be scanned. Embodiments herein allow for the cryptographical protection of the die-to-die links.

Figure 2B:
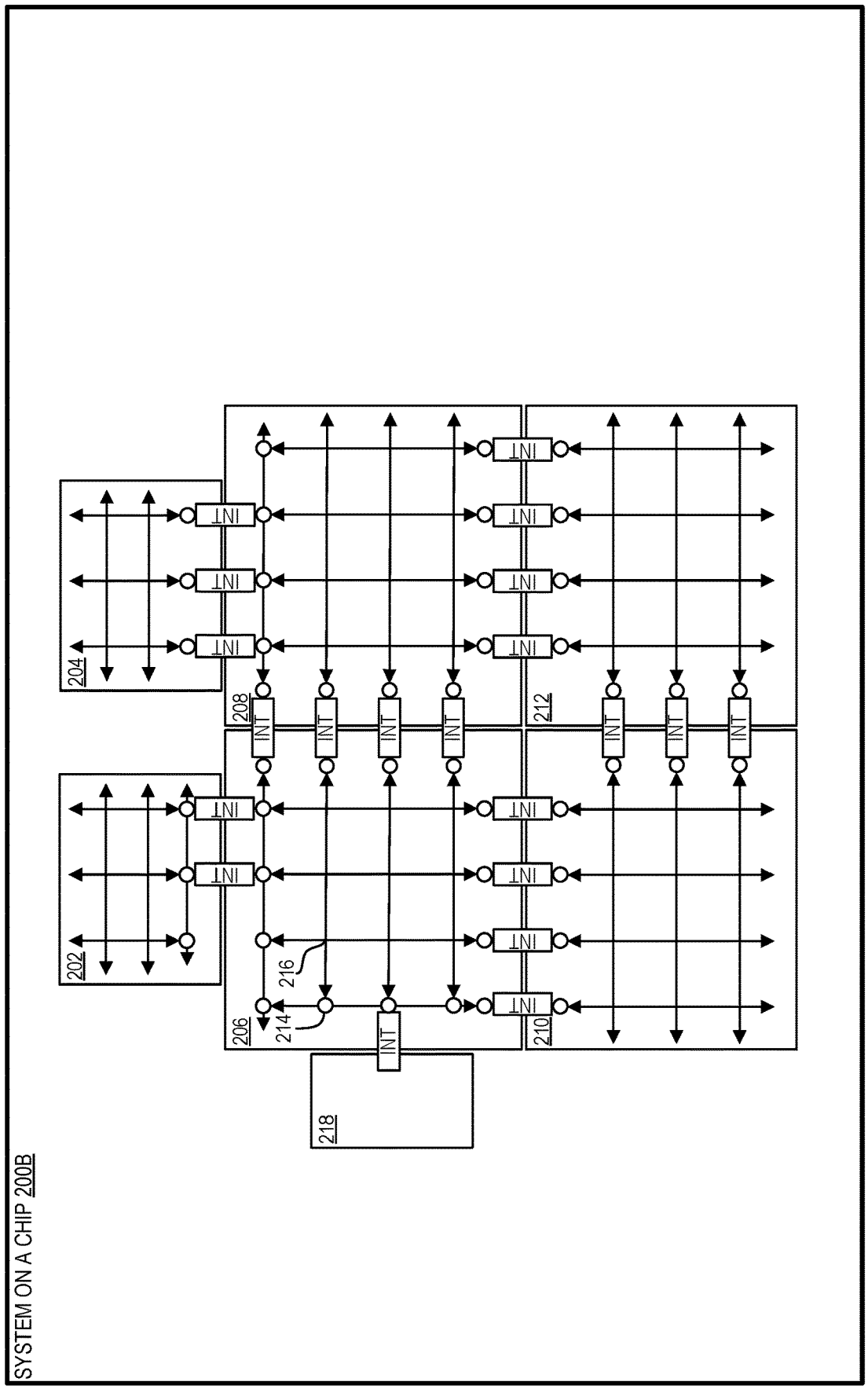
FIG. 2B illustrates another system on a chip (SoC) having a plurality of interconnected chiplets according to embodiments of the disclosure.

FIG. 2B illustrates another system on a chip (SoC) 200B having a plurality of interconnected chiplets 202, 204, 206, 208, 210, and 212 according to embodiments of the disclosure. In the depicted embodiment, die 202 and 204 are smaller than die 206, die 208, die 210, and die 212. Each of the depicted dies is coupled to an adjacent die via an interconnect (INT), e.g., according to the disclosure herein. Die 202 is depicted as having two connections (e.g., discrete interconnects) with die 206. Die 204 is depicted as having a different number of (e.g., three) connections (e.g., discrete interconnects) with die 208. Die 206 is depicted as having four connections (e.g., discrete interconnects) with die 208. Die 210 is depicted as having a different number of (e.g., three) connections (e.g., discrete interconnects) with die 212.

The intersection of mesh interconnect of a die (e.g., intersection 214 or intersection 216 of die 206) may be the access point into the mesh interconnect, e.g., by a circuit component. In one embodiment, multiple (e.g., any) mesh configurations with different sizes on their respective die are coupled together by certain embodiments herein. In one embodiment, a die with a mesh interconnect is coupled to a die without a mesh interconnect, for example, die 218 is depicted in FIG. 2A as coupled to mesh interconnect of die 206 though single interconnect (INT).

Figure 2C:
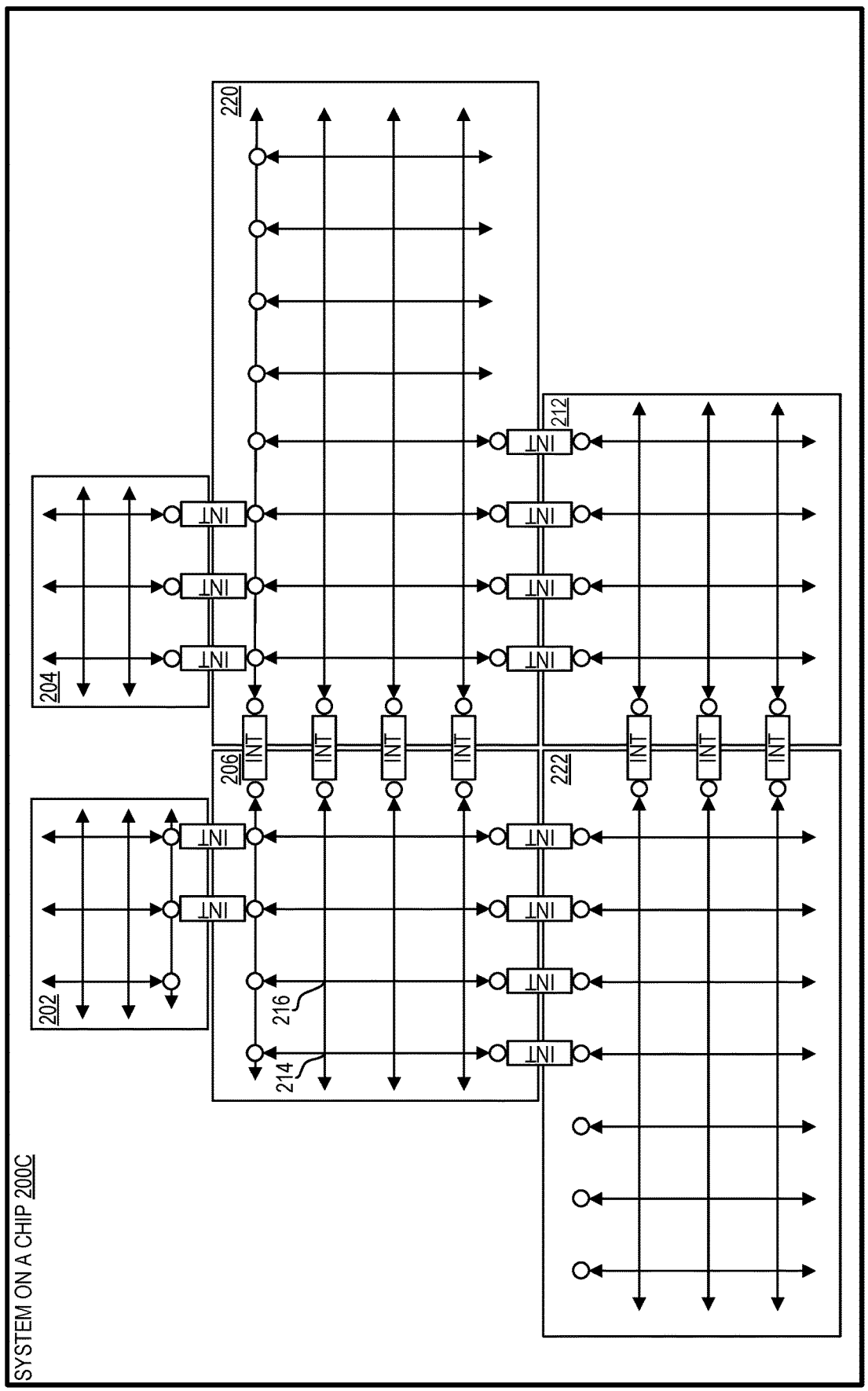
FIG. 2C illustrates yet another a system on a chip (SoC) having a plurality of interconnected chiplets according to embodiments of the disclosure.

FIG. 2C illustrates yet another a system on a chip (SoC) 200C having a plurality of interconnected chiplets according to embodiments of the disclosure. In the depicted embodiment, die 202 and 204 are smaller than die 206, die 220, die 222, and die 212. Die 220 is depicted as including a different mesh interconnect than die 222, e.g., having a different number of intersections. FIG. 2C illustrates that certain of a plurality of dies may be different in certain embodiments (e.g., in one embodiment, they are not symmetric). FIG. 2B illustrates that a mesh interconnect on a die may be different than another mesh interconnect on a different die in certain embodiments (e.g., in one embodiment, they are not symmetric).

Figure 3:
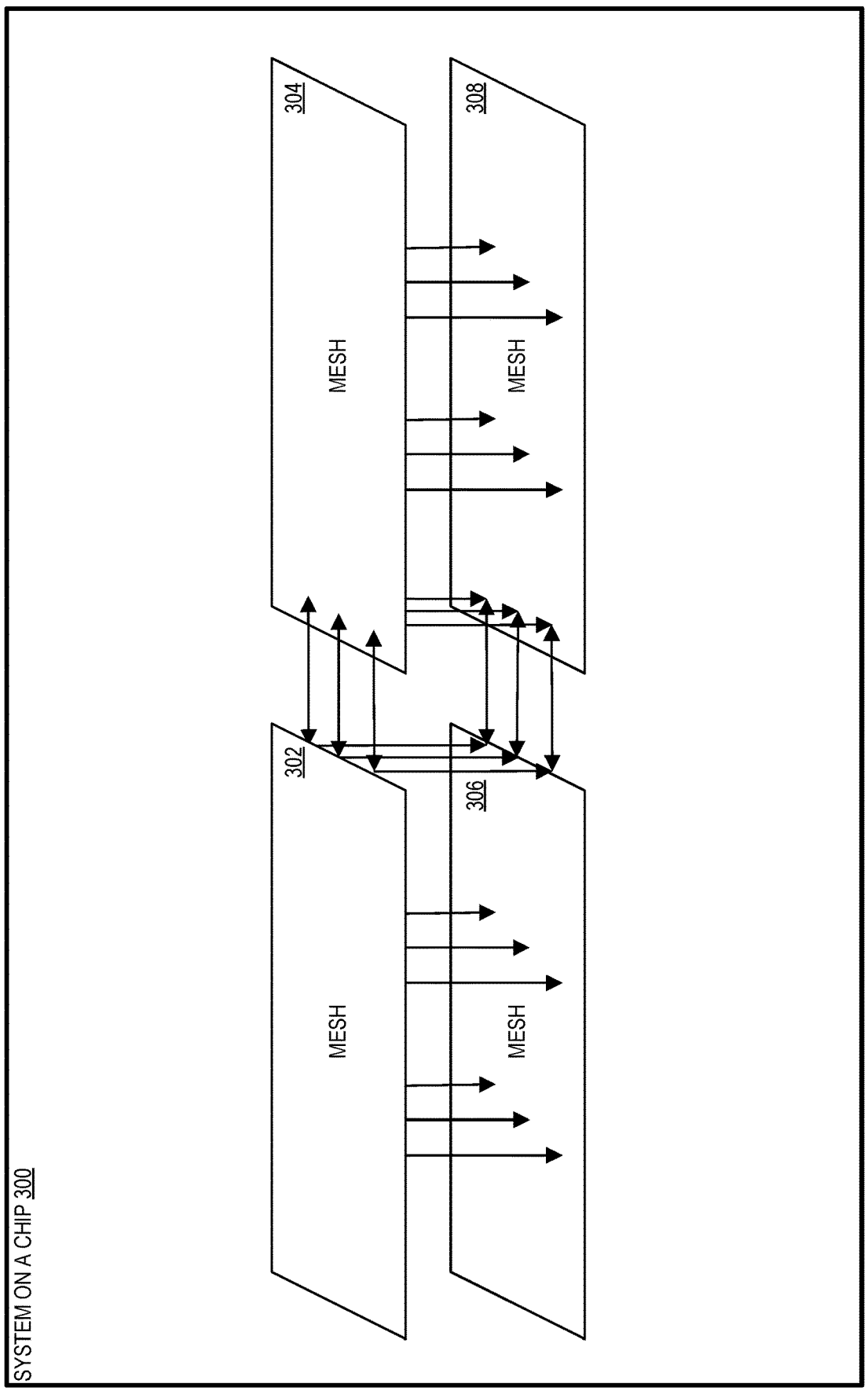
FIG. 3 illustrates a system on a chip (SoC) having a plurality of interconnected chiplets in a three-dimensional arrangement according to embodiments of the disclosure.

FIG. 3 illustrates a system on a chip (SoC) 300 having a plurality of interconnected chiplets 302, 304, 306, and 308 in a three-dimensional arrangement according to embodiments of the disclosure. A mesh interconnect is not shown within each die for clarity, but it may be utilized, e.g., as in the other Figures. FIG. 3 illustrates a three-dimensional stacked architecture. A plurality of dies may extend in any single direction (e.g., with an interconnect(s) between each die). In the depicted embodiment, die 302 and die 304 extend in a first, single plane and die 306 and die 308 extend in a second, different single plane that is laterally spaced from the first single plane. A die may be affixed to another substrate, e.g., a mounting substrate (not depicted).

In certain embodiments, a first die communicates with (e.g., to and/or from) one or more other dies, e.g., via an electrical connection therebetween. A transceiver (e.g., including a transmitter circuit and/or receiver circuit) may be utilized in one or more of the dies and/or in an interconnect between the dies. A transceiver (e.g., transceiver circuit) may include a physical transport layer (e.g., PHY) circuit (e.g., Input/Output PHY or I/O PHY). Transceivers may be used for communication between multiple dies, e.g., multiple dies that comprise a split-die processor arrangement. In one embodiment, one or more of multiple dies has one or more of its I/O ports (e.g., mesh wires) electrically coupled to the I/O ports (e.g., mesh wires) of another die or dies. In one embodiment, one or more of multiple dies includes a mesh interconnect within the die and each mesh interconnect may have one or more of its I/O ports (e.g., mesh wires) electrically coupled to the I/O ports (e.g., mesh wires) of a mesh interconnect of another die, e.g., at a die boundary crossing. An electrical coupling of dies may be customized for optimized power and latency performance. The couplings (e.g., wires) may be bi-directional, uni-directional, or a combination of both. The physical medium connecting and allowing signaling between the multiple die transceivers (e.g., I/O PHYs) may be an interconnect or other electrical connection. In certain embodiments, the electrical coupling(s) includes a die-to-die communication circuit.

Figure 4:
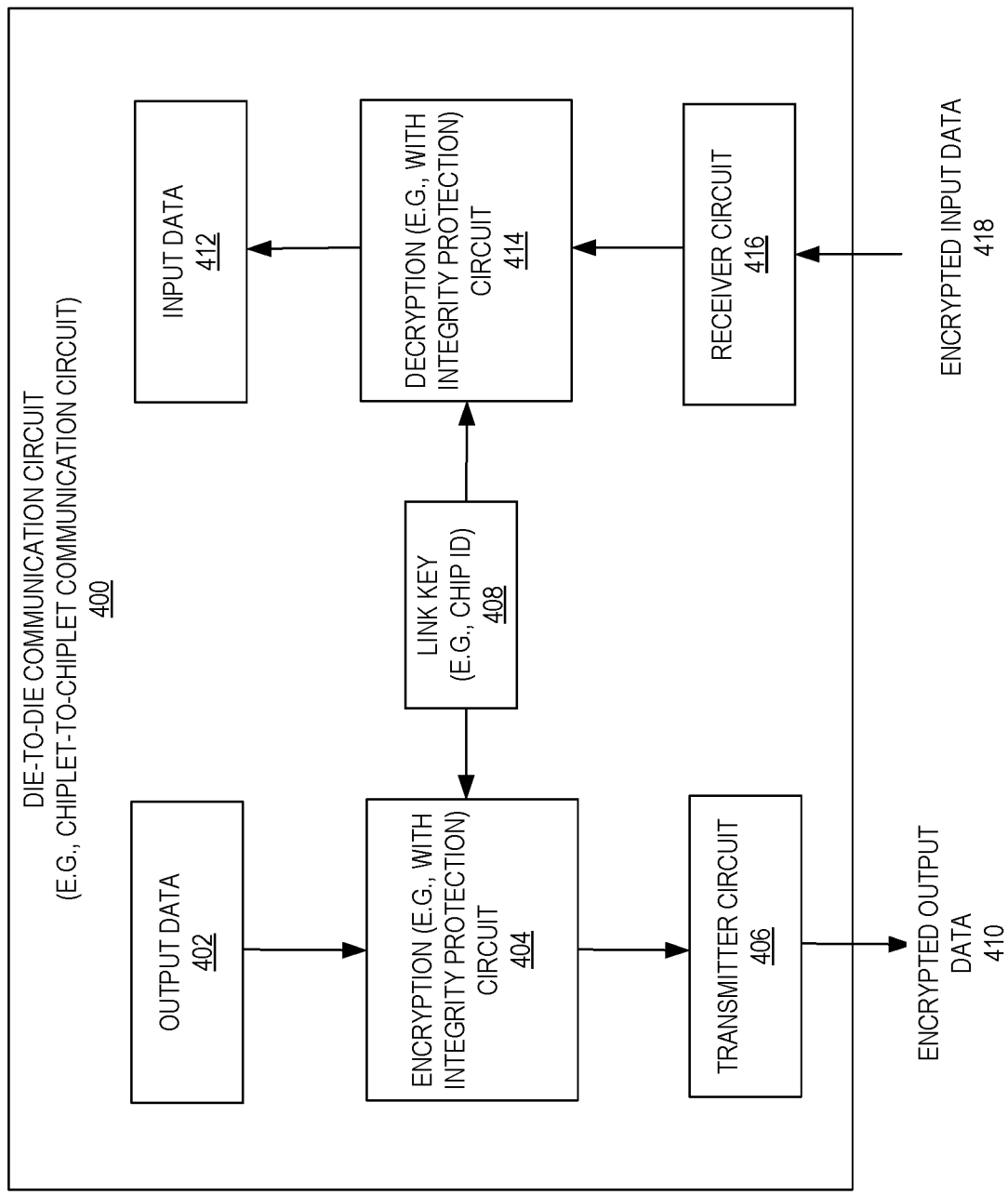
FIG. 4 illustrates a die-to-die communication circuit according to embodiments of the disclosure.

FIG. 4 illustrates a die-to-die communication circuit 400 according to embodiments of the disclosure. In certain embodiments, data 402 to be output from a die (e.g., chiplet) (e.g., a buffer thereof) including die-to-die communication circuit 400 to another die (e.g., chiplet) is sent to encryption circuit 404 which encrypts the data (optionally, adds integrity to the data with integrity protection by an integrity protection circuit thereof) according to (e.g., non-software accessible) link key 408 (e.g., chip ID), and transmits the encrypted data 410 via transmitter circuit 406. In certain embodiments, data 418 input from a die (e.g., chiplet) into a die (e.g., chiplet) including die-to-die communication circuit 400 (e.g., receiver circuit 416) is sent to decryption circuit 414 which decrypts the data (optionally, checks for the integrity of the data with integrity protection by an integrity protection circuit thereof) according to link key 408 (e.g., chip ID), and transmits the decrypted data to input data 412 (e.g., as a buffer). In certain embodiments, on having a message to send, the transmit encryption engine encrypts (and optionally integrity protects) the data (e.g., message) and sends it to the receiving chiplet, e.g., and on receiving a message, the receive decryption engine decrypts (and verifies the integrity of the message received when the data is sent with integrity protection).

In certain embodiments, in order to support cryptographic protection for the die-to-die connections (e.g., links), each die (e.g., chiplet) includes an instance of a die-to-die communication circuit (e.g., a die-to-die communication circuit 400), e.g., having an encryption engine which provides encryption and integrity. In the depicted embodiment, the encryption circuit 404 is depicted as being separate from the decryption circuit 414, although in other embodiments a single (e.g., unified) cryptographic circuit may be utilized.

In order for the protocol to work, certain embodiments herein utilize a (e.g., link) key that is shared. Example options for key provisioning include, but are not limited to: (i) at manufacturing time, each of the dies (e.g., chiplets) is provisioned with a same key to use, (ii) at manufacturing time, each of the die (e.g., chiplet) pairs that are to communicate is provisioned with a per-pair key (e.g., where this option will provide stronger separation and/or uses additional fuses per chiplet for the keys), or (iii) a chip identification key (e.g., or system ID key) is generated in manufacturing (e.g., and checked against a manufacturing database). In one embodiment, the chip identification key is distributed to the other (e.g., non-CPU chiplets) chiplets by a first (e.g., CPU chiplet), e.g., using individual keys to all the chiplets. In certain embodiments, the keys in fuses are protected further with a root PUF key.

Embodiments herein thus provide that (e.g., in the field), if an original chiplet is replaced with a malicious chiplet, since the malicious chiplet is not provisioned with the link key, messages received from this chiplet (masquerading as a good chiplet) result in integrity failure. Similarly, messages sent from other chiplets will not be decrypted correctly by the malicious chiplet as the malicious chiplet does not have the knowledge of the link key(s).

In certain embodiments, the cryptographic algorithm used for die-to-die (e.g., chiplet-to-chiplet) links is AES (e.g., in XTS mode that uses its own secret key ("tweak key") that is completely different from a primary encryption key) with a MAC algorithm such as, but not limited to, KMAC. It should be noted that some implementations can also chose authentication encryption algorithms (e.g., AES Galois/Counter Mode (AES-GCM)) to also provide anti-replay for messages flowing over the links.

Figure 5:
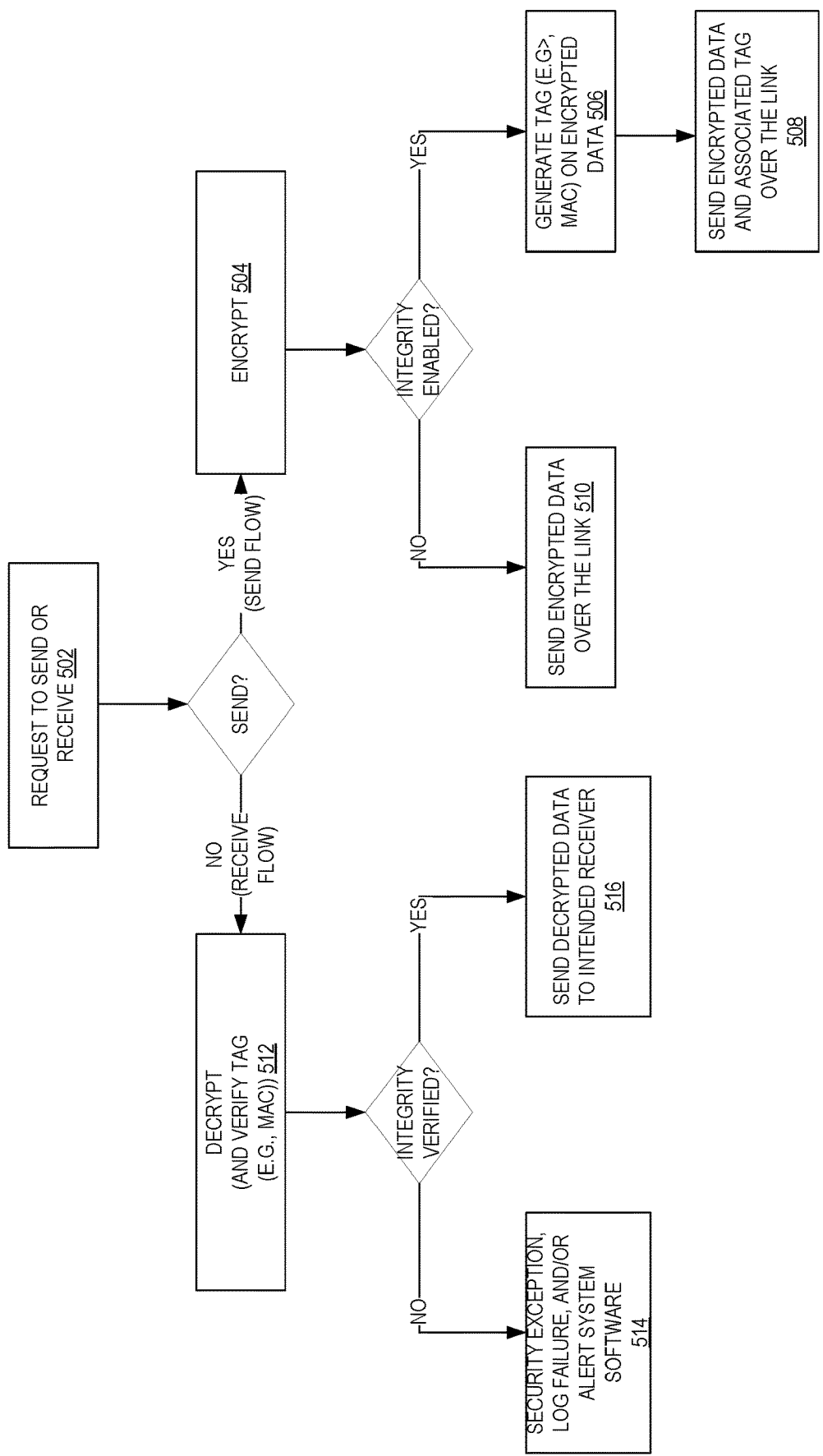
FIG. 5 is a flow diagram illustrating operations for die-to-die communications according to embodiments of the disclosure.

FIG. 5 is a flow diagram illustrating operations 500 for die-to-die communications according to embodiments of the disclosure. In certain embodiments, if it is a request 502 to send data, die-to-die communication circuit is to encrypt that data at 504, and, if integrity is enabled, generate a tag (e.g., MAC) for the encrypted data at 506, and send the encrypted data and associated tag over the link at 508, and if integrity is not enabled, send the encrypted data over the link at 510. In certain embodiments, if it is a request 502 to receive data, die-to-die communication circuit is to decrypt that data at 512, and pass it into the receiving die, and if integrity is enabled, verify the received tag (e.g., MAC) for the encrypted data is correct, and if the tag is not verified, cause a corresponding action (e.g., security exception, log failure, and/or alert system software) at 514, and if the tag is verified, send the decrypted data to the intended receiver with the receiving die.

Figure 6:
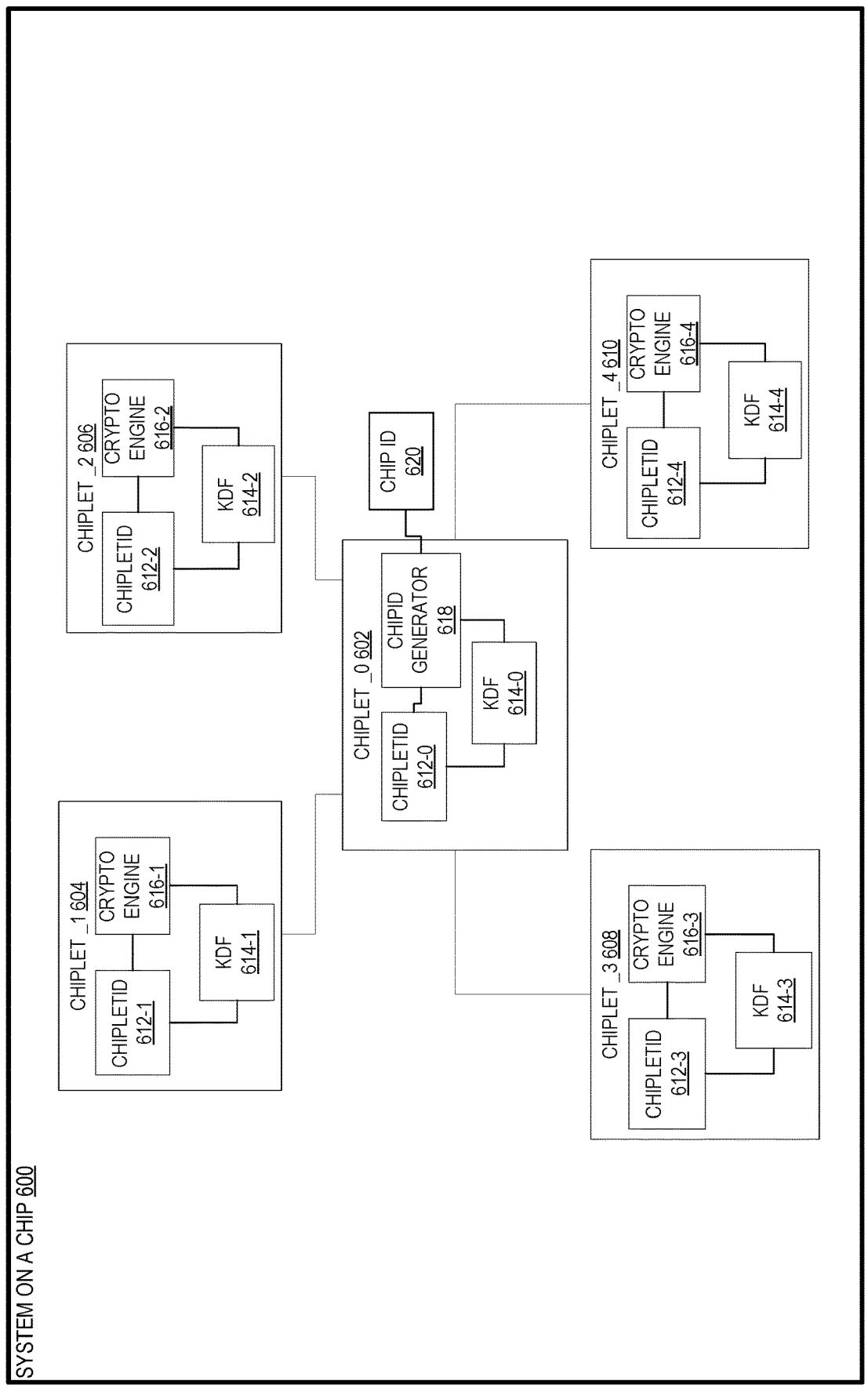
FIG. 6 illustrates a system on a chip (SoC) having a plurality of interconnected chiplets according to embodiments of the disclosure.

FIG. 6 illustrates a system on a chip (SoC) 600 having a plurality of interconnected chiplets 602, 604, 606, 608, and 610 according to embodiments of the disclosure. In certain embodiments, each chiplet includes a chiplet ID, for example, chiplet ID 612-0 for chiplet 602, chiplet ID 612-1 for chiplet 604, chiplet ID 612-2 for chiplet 606, chiplet ID 612-3 for chiplet 608, and chiplet ID 612-4 for chiplet 610. In certain embodiments, each chiplet ID is a multiple bit value (e.g., 256 or 512 bits wide). In certain embodiments, each chiplet includes a key derivation function (KDF) circuit that derives a secret based on the random number programmed for the chiplet (e.g., at manufacture), e.g., a KDF circuit to generate a chiplet ID for each chiplet, for example, KDF circuit 614-0 for chiplet 602, KDF circuit 614-1 for chiplet 604, KDF circuit 614-2 for chiplet 606, KDF circuit 614-3 for chiplet 608, and KDF circuit 614-4 for chiplet 610.

In certain embodiments, chiplet 602 (for example, as CPU chiplet, e.g., and the other chiplets not being a CPU chiplet) includes a chip ID generator to generate a chip ID 620, for example, according to the disclosure herein.

In certain embodiments, generation of a chip ID is done only at manufacturing. For example, when the CPU chiplet (e.g., first) boots, it makes a request to all the dies (e.g., chiplets) forming that single system (e.g., device) to provide their chiplet IDs, e.g., via their die-to-die communication circuits. In certain embodiments, the chiplet IDs are communicated to the CPU chiplet through unsecure channels. However, even if there is an adversary sitting in the channel it cannot get the chiplet ID of the CPU die in certain embodiments, and hence cannot generate a chip ID. In certain embodiments, an active adversary cannot inject chiplet IDs and force the CPU chiplet to generate a known but spurious chip ID, e.g., even where the entities that make the chip are different from the entities that make (e.g., package) the system (e.g., device). In certain embodiments, the chip ID verification is done at the device manufacturing (e.g., foundry), e.g., separate from system (e.g., device) manufacturing. In certain embodiments, only a design house can create (e.g., genuine) chiplet IDs.

In certain embodiments, if there is a malicious chiplet, it would need to know a genuine chiplet ID to act like a genuine chiplet, e.g., and where the chiplet IDs are not known to an attacker (e.g., they are only visible in the netlist), the malicious entity will have to compromise the design house or the foundry.

In certain embodiments, once the ChipID is generated, the chip ID (e.g., the encrypted (e.g., cyphertext) form of the chipID) is communicated to all the chiplets (e.g., by encrypting it with a key derived from each chiplet's chipletID). Thus, that chiplet can then determine the chip ID, e.g., by extracting (e.g., decrypting) the chip ID and save it, such that all the chiplets in the package have the same key. In certain embodiments, the chip ID is used to encrypt keys in the fuses since no one foundry can determine the chip ID.

In certain embodiments, a device manufacturer can be assured that its chips are not tampered in the supply chain since it can validate the Chip ID (or a system ID formed from the chip ID and a nonce) with a known chip ID database (e.g., provided/maintained by the (e.g., CPU) chip) manufacturer.

Figure 7A:
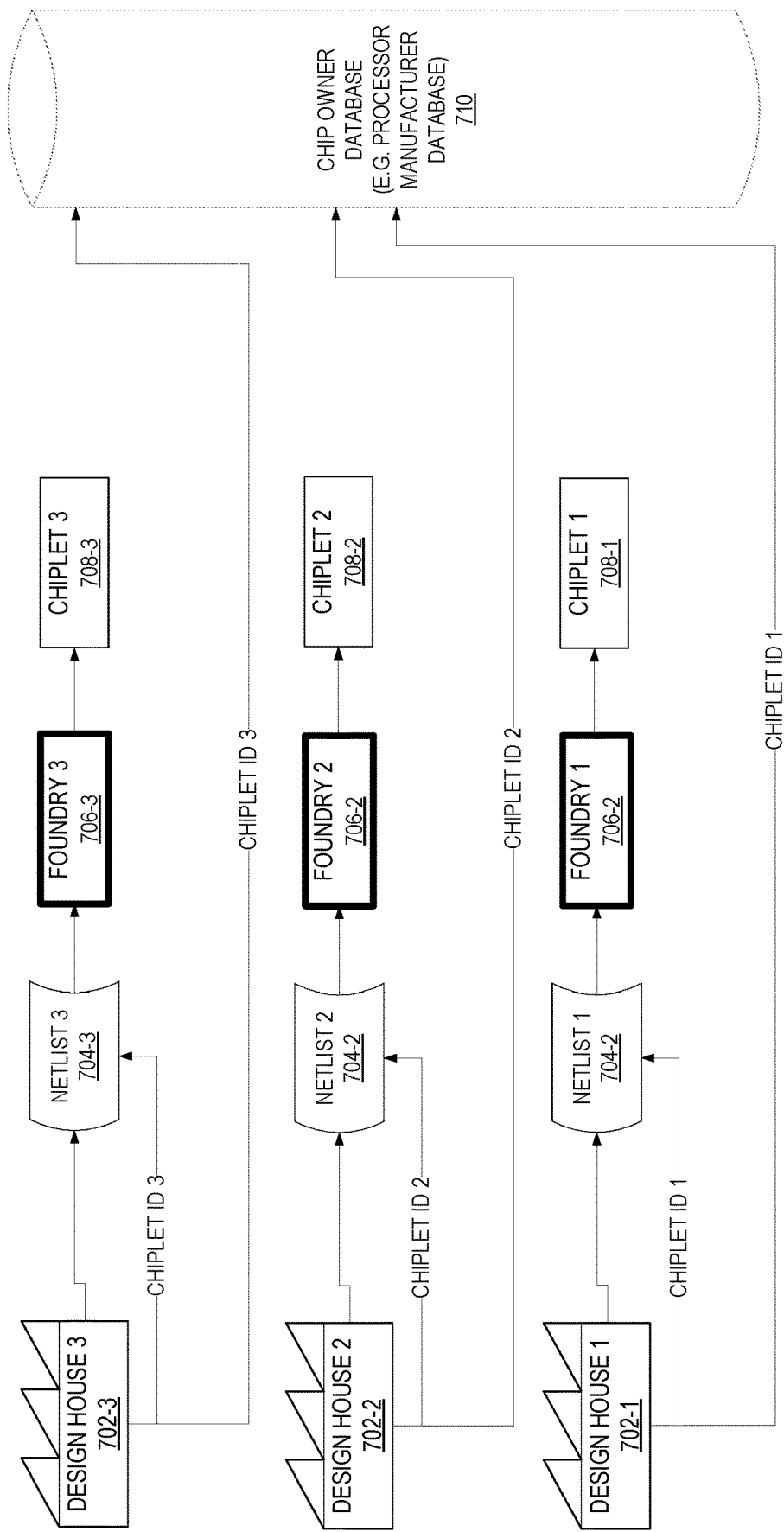
FIG. 7A is a flow diagram illustrating operations for generating chiplets that each having a respective chiplet identification (ID) value according to embodiments of the disclosure.

FIG. 7A is a flow diagram illustrating operations for generating chiplets that each having a respective chiplet identification (ID) value according to embodiments of the disclosure. In certain embodiments, each die (e.g., chiplet) is designed by a respective design house, for example, design house 702-3 designing chiplet 708-3, design house 702-2 designing chiplet 708-2, and design house 702-1 designing chiplet 708-1. In certain embodiments, each chiplet (e.g., design) includes a respective chiplet ID (or value that is used to generate the chiplet ID). In certain embodiments, the chiplet ID is stored in the respective netlist for the chiplet design, for example, chiplet ID 3 stored in netlist 704-3 for the design of chiplet 708-3, chiplet ID 2 stored in netlist 704-2 for the design of chiplet 708-2, and chiplet ID 1 stored in netlist 704-1 for the design of chiplet 708-1. In certain embodiments, the respective chiplet ID (or value that is used to generate the chiplet ID) is stored in a (e.g., chip owner) database 710, e.g., a processor chiplet manufacturer's database.

In certain embodiments, a respective foundry produces one or more of the chiplets according to the (e.g., digital) design file (e.g., netlist), for example, foundry 706-3 producing chiplet 708-3, foundry 706-2 producing chiplet 708-2, and foundry 706-1 producing chiplet 708-1. A chiplet may be a CPU chiplet, e.g., including a hardware processor that controls the boot, etc. of the system (e.g., package).

Figure 7B:
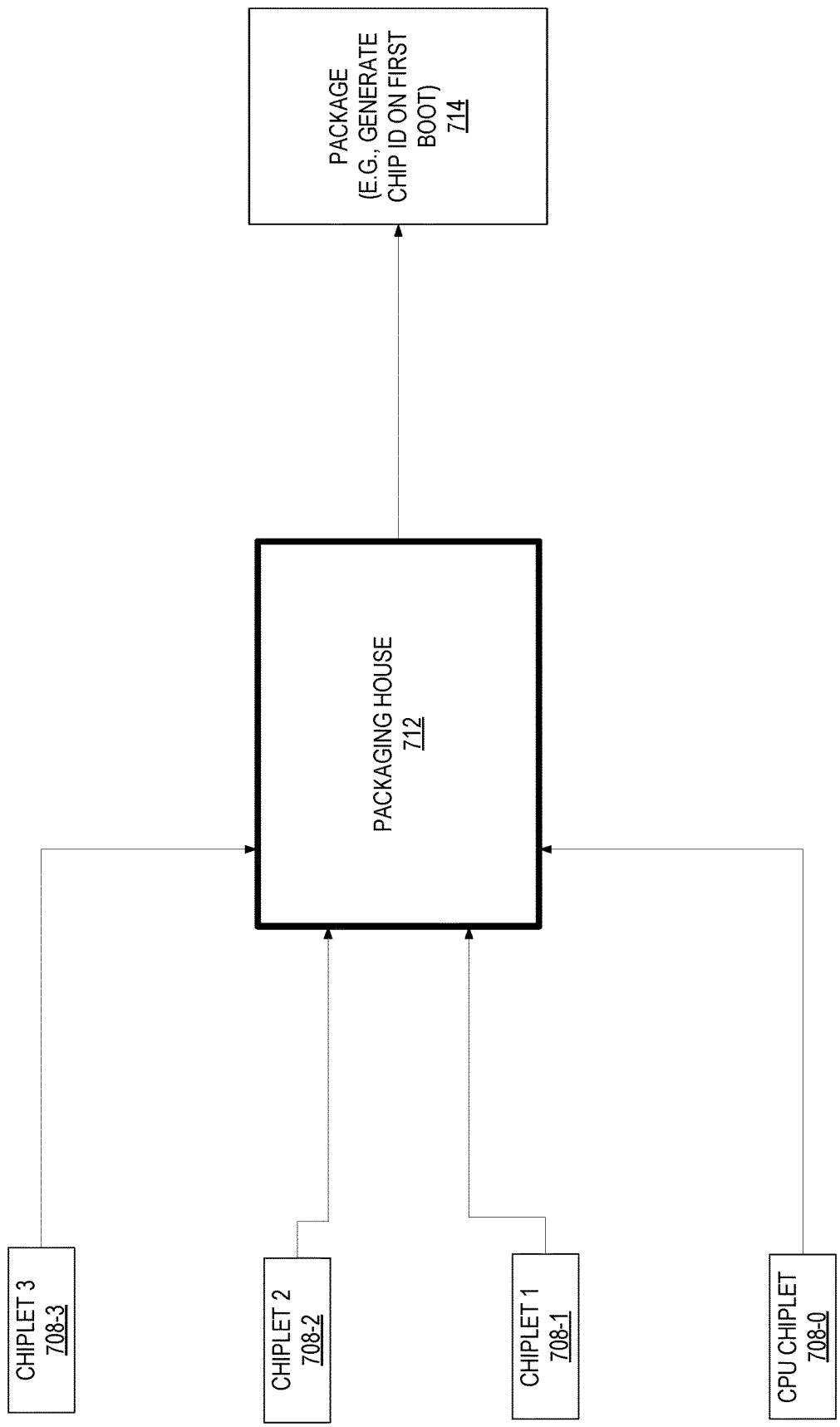
FIG. 7B is a flow diagram illustrating operations for generating a package from a plurality of chiplets according to embodiments of the disclosure.

FIG. 7B is a flow diagram illustrating operations for generating a package 714 from a plurality of chiplets 708-3, 708-2, 708-1, and 708-0 according to embodiments of the disclosure. In certain embodiments, packaging house 712 (e.g., separate from one or more of the foundries and/or design houses) creates a single package 714 (e.g., SoC) from chiplets 708-3, 708-2, 708-1, and 708-0. In certain embodiments (e.g., on first boot of the package 714), the package 714 (e.g., CPU chiplet 708-0 thereof) generates a chip ID, e.g., as discussed herein.

Figure 7C:
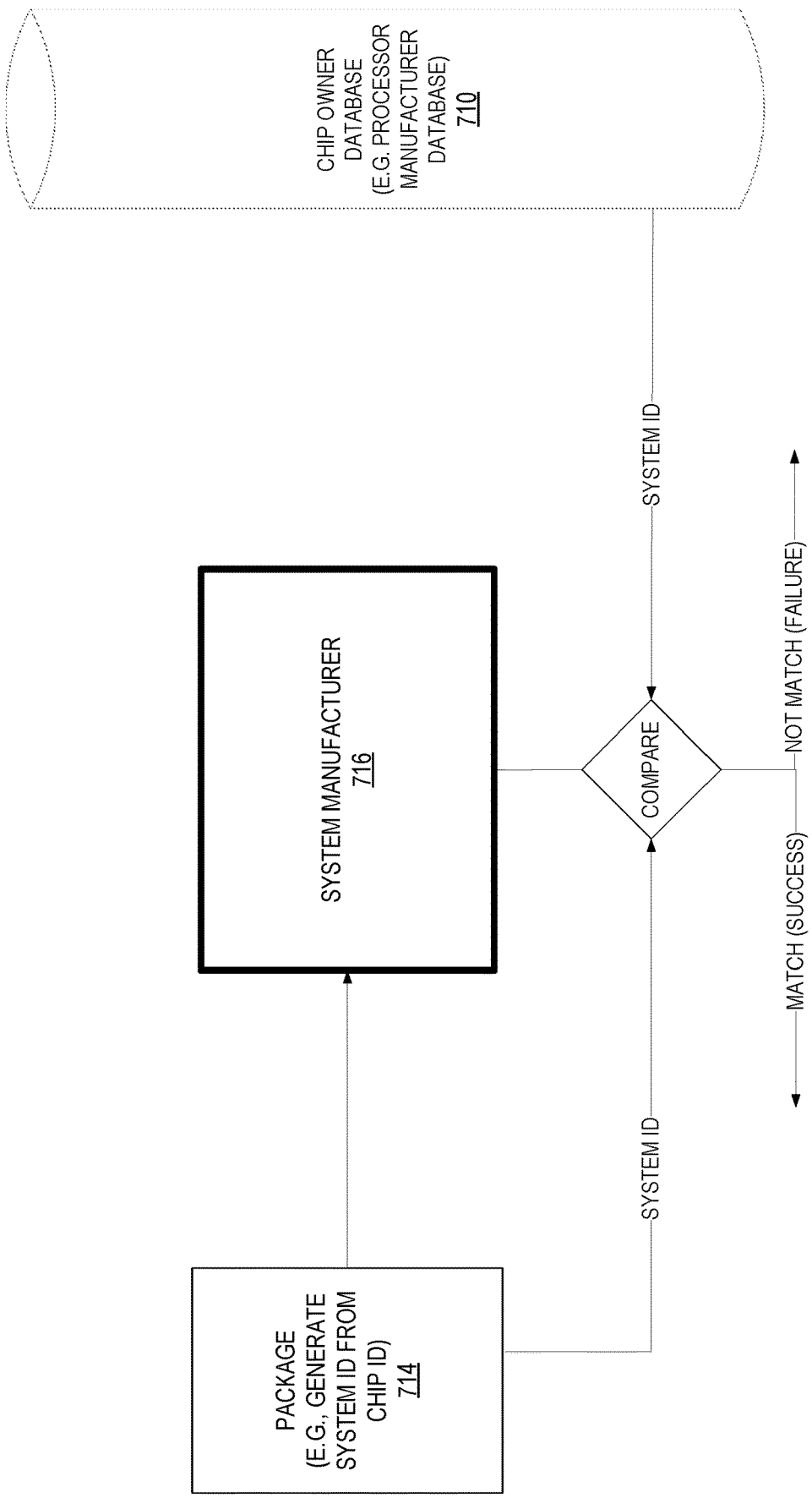
FIG. 7C is a flow diagram illustrating operations for checking a system identification (ID) value of a package according to embodiments of the disclosure.

FIG. 7C is a flow diagram illustrating operations for checking a system identification (ID) value of a package 714 according to embodiments of the disclosure. In certain embodiments, system manufacturer 716 includes package 714 in a system (e.g., device). In certain embodiments, the package 714 (e.g., CPU chiplet 708-0 thereof) generates a system ID based on the package ID, for example, based on the package ID and a value (e.g., nonce) provided by the system manufacturer 716 (for example, SystemID=KDF (ChipID, nonce)).

In certain embodiments, this system ID is compared to the corresponding (e.g., expected) system ID from the database 710, e.g., and a match indicating the system (e.g., including package 714) is genuine (e.g., and the package and/or system is allowed to continue to operate or other remedial action is not taken) and not matching indicating a failure (e.g., and the package and/or system is not allowed to continue to operate or other remedial action is taken).

In other embodiments, the Chip ID from the package 714 is compared to the corresponding (e.g., expected) chip ID from the database 710, e.g., and a match indicating the package is genuine (e.g., and the package is allowed to continue to operate or other remedial action is not taken) and not matching indicating a failure (e.g., and the package is not allowed to continue to operate or other remedial action is taken).

In certain embodiments, (i) communications are disabled between a first die (e.g., chiplet) and one or more other dies (e.g., chiplet(s)) when (e.g., in response to) there is not a match (e.g., there is a failure) and/or (ii) the system (e.g., entire SoC chip)) is disabled (e.g., deactivated) when (e.g., in response to) there is not a match (e.g., there is a failure as discussed herein).

FIG. 8 is a flow diagram illustrating operations 800 for enabling die binding in a system having a disaggregated architecture according to embodiments of the disclosure. Some or all of the operations 800 (or other processes described herein, or variations, and/or combinations thereof) are performed under the control of a computing device.

The operations 800 include, at block 802, electrically coupling a plurality of physically separate dies together with an interconnect into a system. The operations 800 further include, at block 804, storing a link key into a first die-to-die communication circuit, of a first die of the plurality of physically separate dies, comprising a transmitter circuit and an encryption circuit using the link key to encrypt data to be sent from the transmitter circuit into encrypted data. The operations 800 further include, at block 806, storing the link key into a second die-to-die communication circuit, of a second die of the plurality of physically separate dies, comprising a receiver circuit and a decryption circuit using the link key to decrypt the encrypted data sent from the transmitter circuit to the receiver circuit.

Exemplary architectures, systems, etc. that the above may be used in are detailed below.

At least some embodiments of the disclosed technologies can be described in view of the following examples:

Example 1. A system comprising:
a plurality of physically separate dies;
an interconnect to electrically couple the plurality of physically separate dies together;
a first die-to-die communication circuit, of a first die of the plurality of physically separate dies, comprising a transmitter circuit and an encryption circuit having a link key to encrypt data to be sent from the transmitter circuit into encrypted data; and
a second die-to-die communication circuit, of a second die of the plurality of physically separate dies, comprising a receiver circuit and a decryption circuit having the link key to decrypt the encrypted data sent from the transmitter circuit to the receiver circuit.

Example 2. The system of example 1, wherein each of the plurality of physically separate dies is provided the link key at manufacturing time.

Example 3. The system of example 1, wherein the first die and the second die are provided the link key at manufacturing time, and a different pair of physically separate dies is provided a different link key at manufacturing time.

Example 4. The system of example 1, wherein the link key is a chip identification key formed from a first chiplet identification value of the first die and a second chiplet identification value of the second die.

Example 5. The system of example 4, wherein the first die is to receive the second chiplet identification value of the second die on the interconnect, generate the chip identification key, and send the chip identification key to the second die on the interconnect.

Example 6. The system of example 4, wherein the first die-to-die communication circuit or the second die-to-die communication circuit is to check the chip identification key within the system against a chip identification key stored in a database for the system, and disable communication between the first die and the second die (and/or disable the system (e.g., whole SoC chip)) when the chip identification key within the system does not match the chip identification key stored in the database for the system.

Example 7. The system of example 1, wherein the second die-to-die communication circuit, of the second die of the plurality of physically separate dies, comprises a transmitter circuit and an encryption circuit having the link key to encrypt data to be sent from the transmitter circuit of the second die into encrypted data, and the first die-to-die communication circuit, of the first die of the plurality of physically separate dies, comprises a receiver circuit and a decryption circuit having the link key to decrypt the encrypted data sent from the transmitter circuit of the second die to the receiver circuit of the first die.

Example 8. The system of example 1, wherein the first die-to-die communication circuit is further to generate a tag for the encrypted data and send the tag with the encrypted data from the transmitter circuit, and the second die-to-die communication circuit is to decrypt the encrypted data sent from the transmitter circuit to the receiver circuit in response to an integrity check on the tag.

Example 9. A method comprising:
electrically coupling a plurality of physically separate dies together with an interconnect into a system;
storing a link key into a first die-to-die communication circuit, of a first die of the plurality of physically separate dies, comprising a transmitter circuit and an encryption circuit using the link key to encrypt data to be sent from the transmitter circuit into encrypted data; and
storing the link key into a second die-to-die communication circuit, of a second die of the plurality of physically separate dies, comprising a receiver circuit and a decryption circuit using the link key to decrypt the encrypted data sent from the transmitter circuit to the receiver circuit.

Example 10. The method of example 9, wherein the storing the link key in each of the plurality of physically separate dies is at manufacturing time of the system.

Example 11. The method of example 9, wherein the storing of the link key in the first die and the second die is at manufacturing time, and further comprising storing a different link key in a different pair of physically separate dies of the system at manufacturing time.

Example 12. The method of example 9, further comprises forming a chip identification key from a first chiplet identification value of the first die and a second chiplet identification value of the second die, and providing the chip identification key as the link key.

Example 13. The method of example 12, further comprising: receiving the second chiplet identification value of the second die at the first die on the interconnect, wherein the forming of the chip identification key is by the first die; and sending the chip identification key from the first die to the second die on the interconnect.

Example 14. The method of example 12, further comprising:
checking the chip identification key within the system against a chip identification key stored in a database for the system; and
disabling communication between the first die and the second die when the chip identification key within the system does not match the chip identification key stored in the database for the system.

Example 15. The method of example 9, wherein the second die-to-die communication circuit, of the second die of the plurality of physically separate dies, comprises a transmitter circuit and an encryption circuit using the link key to encrypt data to be sent from the transmitter circuit of the second die into encrypted data, and the first die-to-die communication circuit, of the first die of the plurality of physically separate dies, comprises a receiver circuit and a decryption circuit using the link key to decrypt the encrypted data sent from the transmitter circuit of the second die to the receiver circuit of the first die.

Example 16. The method of example 9, further comprising:
generating a tag for the encrypted data by the first die-to-die communication circuit; and
sending the tag with the encrypted data from the transmitter circuit of the first die-to-die communication circuit, wherein the second die-to-die communication circuit decrypts the encrypted data sent from the transmitter circuit to the receiver circuit in response to an integrity check on the tag.

Example 17. A system on a chip comprising:
a plurality of physically separate chiplets;
an interconnect to electrically couple the plurality of physically separate chiplets together;
a first chiplet-to-chiplet communication circuit, of a first chiplet of the plurality of physically separate chiplets, comprising a transmitter circuit and an encryption circuit having a link key to encrypt data to be sent from the transmitter circuit into encrypted data; and
a second chiplet-to-chiplet communication circuit, of a second chiplet of the plurality of physically separate chiplets, comprising a receiver circuit and a decryption circuit having the link key to decrypt the encrypted data sent from the transmitter circuit to the receiver circuit.

Example 18. The system on a chip of example 17, wherein each of the plurality of physically separate chiplets is provided the link key at manufacturing time.

Example 19. The system on a chip of example 17, wherein the first chiplet and the second chiplet are provided the link key at manufacturing time, and a different pair of physically separate chiplets is provided a different link key at manufacturing time.

Example 20. The system on a chip of example 17, wherein the link key is a chip identification key formed from a first chiplet identification value of the first chiplet and a second chiplet identification value of the second chiplet.

Example 21. The system on a chip of example 20, wherein the first chiplet is to receive the second chiplet identification value of the second chiplet on the interconnect, generate the chip identification key, and send the chip identification key to the second chiplet on the interconnect.

Example 22. The system on a chip of example 20, wherein the first chiplet-to-chiplet communication circuit or the second chiplet-to-chiplet communication circuit is to check the chip identification key within the system on a chip against a chip identification key stored in a database for the system on a chip, and disable communication between the first chiplet and the second chiplet (and/or disable the system (e.g., whole SoC chip)) when the chip identification key within the system on a chip does not match the chip identification key stored in the database for the system on a chip.

Example 23. The system on a chip of example 17, wherein the second chiplet-to-chiplet communication circuit, of the second chiplet of the plurality of physically separate chiplets, comprises a transmitter circuit and an encryption circuit having the link key to encrypt data to be sent from the transmitter circuit of the second chiplet into encrypted data, and the first chiplet-to-chiplet communication circuit, of the first chiplet of the plurality of physically separate chiplets, comprises a receiver circuit and a decryption circuit having the link key to decrypt the encrypted data sent from the transmitter circuit of the second chiplet to the receiver circuit of the first chiplet.

Example 24. The system on a chip of example 17, wherein the first chiplet-to-chiplet communication circuit is further to generate a tag for the encrypted data and send the tag with the encrypted data from the transmitter circuit, and the second chiplet-to-chiplet communication circuit is to decrypt the encrypted data sent from the transmitter circuit to the receiver circuit in response to an integrity check on the tag.

In yet another embodiment, an apparatus comprises a data storage device that stores code that when executed by a hardware processor causes the hardware processor to perform any method disclosed herein. An apparatus may be as described in the detailed description. A method may be as described in the detailed description.

An instruction set may include one or more instruction formats. A given instruction format may define various fields (e.g., number of bits, location of bits) to specify, among other things, the operation to be performed (e.g., opcode) and the operand(s) on which that operation is to be performed and/or other data field(s) (e.g., mask). Some instruction formats are further broken down though the definition of instruction templates (or subformats). For example, the instruction templates of a given instruction format may be defined to have different subsets of the instruction format's fields (the included fields are typically in the same order, but at least some have different bit positions because there are less fields included) and/or defined to have a given field interpreted differently. Thus, each instruction of an ISA is expressed using a given instruction format (and, if defined, in a given one of the instruction templates of that instruction format) and includes fields for specifying the operation and the operands. For example, an exemplary ADD instruction has a specific opcode and an instruction format that includes an opcode field to specify that opcode and operand fields to select operands (source1/destination and source2); and an occurrence of this ADD instruction in an instruction stream will have specific contents in the operand fields that select specific operands. A set of SIMD extensions referred to as the Advanced Vector Extensions (AVX) (AVX1 and AVX2) and using the Vector Extensions (VEX) coding scheme has been released and/or published (e.g., see Intel® 64 and IA-32 Architectures Software Developer's Manual, November 2018; and see Intel® Architecture Instruction Set Extensions Programming Reference, October 2018).

Exemplary Core Architectures, Processors, and Computer Architectures

Processor cores may be implemented in different ways, for different purposes, and in different processors. For instance, implementations of such cores may include: 1) a general purpose in-order core intended for general-purpose computing; 2) a high-performance general purpose out-of-order core intended for general-purpose computing; 3) a special purpose core intended primarily for graphics and/or scientific (throughput) computing. Implementations of different processors may include: 1) a CPU including one or more general purpose in-order cores intended for general-purpose computing and/or one or more general purpose out-of-order cores intended for general-purpose computing; and 2) a coprocessor including one or more special purpose cores intended primarily for graphics and/or scientific (throughput). Such different processors lead to different computer system architectures, which may include: 1) the coprocessor on a separate chip from the CPU; 2) the coprocessor on a separate die in the same package as a CPU; 3) the coprocessor on the same die as a CPU (in which case, such a coprocessor is sometimes referred to as special purpose logic, such as integrated graphics and/or scientific (throughput) logic, or as special purpose cores); and 4) a system on a chip that may include on the same die the described CPU (sometimes referred to as the application core(s) or application processor(s)), the above described coprocessor, and additional functionality. Exemplary graphics processors are described next. Followed by exemplary core architectures, and descriptions of exemplary processors and computer architectures.

Exemplary Core Architectures

In-Order and Out-of-Order Core Block Diagram

FIG. 9A is a block diagram illustrating both an exemplary in-order pipeline and an exemplary register renaming, out-of-order issue/execution pipeline according to embodiments of the disclosure. FIG. 9B is a block diagram illustrating both an exemplary embodiment of an in-order architecture core and an exemplary register renaming, out-of-order issue/execution architecture core to be included in a processor according to embodiments of the disclosure. The solid lined boxes in FIGS. 9A-B illustrate the in-order pipeline and in-order core, while the optional addition of the dashed lined boxes illustrates the register renaming, out-of-order issue/execution pipeline and core. Given that the in-order aspect is a subset of the out-of-order aspect, the out-of-order aspect will be described.

In FIG. 9A, a processor pipeline 900 includes a fetch stage 902, a length decode stage 904, a decode stage 906, an allocation stage 908, a renaming stage 910, a scheduling (also known as a dispatch or issue) stage 912, a register read/memory read stage 914, an execute stage 916, a write back/memory write stage 918, an exception handling stage 922, and a commit stage 924.

FIG. 9B shows processor core 990 including a front-end unit 930 coupled to an execution engine unit 950, and both are coupled to a memory unit 970. The core 990 may be a reduced instruction set computing (RISC) core, a complex instruction set computing (CISC) core, a very long instruction word (VLIW) core, or a hybrid or alternative core type. As yet another option, the core 990 may be a special-purpose core, such as, for example, a network or communication core, compression engine, coprocessor core, general purpose computing graphics processing unit (GPGPU) core, graphics core, or the like.

The front-end unit 930 includes a branch prediction unit 932 coupled to an instruction cache unit 934, which is coupled to an instruction translation lookaside buffer (TLB) 936, which is coupled to an instruction fetch unit 938, which is coupled to a decode unit 940. The decode unit 940 (or decoder or decoder unit) may decode instructions (e.g., macro-instructions), and generate as an output one or more micro-operations, micro-code entry points, micro-instructions, other instructions, or other control signals, which are decoded from, or which otherwise reflect, or are derived from, the original instructions. The decode unit 940 may be implemented using various different mechanisms. Examples of suitable mechanisms include, but are not limited to, look-up tables, hardware implementations, programmable logic arrays (PLAs), microcode read only memories (ROMs), etc. In one embodiment, the core 990 includes a microcode ROM or other medium that stores microcode for certain macro-instructions (e.g., in decode unit 940 or otherwise within the front-end unit 930). The decode unit 940 is coupled to a rename/allocator unit 952 in the execution engine unit 950.

The execution engine unit 950 includes the rename/allocator unit 952 coupled to a retirement unit 954 and a set of one or more scheduler unit(s) 956. The scheduler unit(s) 956 represents any number of different schedulers, including reservations stations, central instruction window, etc. The scheduler unit(s) 956 is coupled to the physical register file(s) unit(s) 958. Each of the physical register file(s) units 958 represents one or more physical register files, different ones of which store one or more different data types, such as scalar integer, scalar floating point, packed integer, packed floating point, vector integer, vector floating point, status (e.g., an instruction pointer that is the address of the next instruction to be executed), etc. In one embodiment, the physical register file(s) unit 958 comprises a vector registers unit, a write mask registers unit, and a scalar registers unit. These register units may provide architectural vector registers, vector mask registers, and general-purpose registers. The physical register file(s) unit(s) 958 is overlapped by the retirement unit 954 to illustrate various ways in which register renaming and out-of-order execution may be implemented (e.g., using a reorder buffer(s) and a retirement register file(s); using a future file(s), a history buffer(s), and a retirement register file(s); using a register maps and a pool of registers; etc.). The retirement unit 954 and the physical register file(s) unit(s) 958 are coupled to the execution cluster(s) 960. The execution cluster(s) 960 includes a set of one or more execution units 962 and a set of one or more memory access units 964. The execution units 962 may perform various operations (e.g., shifts, addition, subtraction, multiplication) and on various types of data (e.g., scalar floating point, packed integer, packed floating point, vector integer, vector floating point). While some embodiments may include a number of execution units dedicated to specific functions or sets of functions, other embodiments may include only one execution unit or multiple execution units that all perform all functions. The scheduler unit(s) 956, physical register file(s) unit(s) 958, and execution cluster(s) 960 are shown as being possibly plural because certain embodiments create separate pipelines for certain types of data/operations (e.g., a scalar integer pipeline, a scalar floating point/packed integer/packed floating point/vector integer/vector floating point pipeline, and/or a memory access pipeline that each have their own scheduler unit, physical register file(s) unit, and/or execution cluster—and in the case of a separate memory access pipeline, certain embodiments are implemented in which only the execution cluster of this pipeline has the memory access unit(s) 964). It should also be understood that where separate pipelines are used, one or more of these pipelines may be out-of-order issue/execution and the rest in-order.

The set of memory access units 964 is coupled to the memory unit 970, which includes a data TLB unit 972 coupled to a data cache unit 974 coupled to a level 2 (L2) cache unit 976. In one exemplary embodiment, the memory access units 964 may include a load unit, a store address unit, and a store data unit, each of which is coupled to the data TLB unit 972 in the memory unit 970. The instruction cache unit 934 is further coupled to a level 2 (L2) cache unit 976 in the memory unit 970. The L2 cache unit 976 is coupled to one or more other levels of cache and eventually to a main memory.

By way of example, the exemplary register renaming, out-of-order issue/execution core architecture may implement the pipeline 900 as follows: 1) the instruction fetch 938 performs the fetch and length decoding stages 902 and 904; 2) the decode unit 940 performs the decode stage 906; 3) the rename/allocator unit 952 performs the allocation stage 908 and renaming stage 910; 4) the scheduler unit(s) 956 performs the schedule stage 912; 5) the physical register file(s) unit(s) 958 and the memory unit 970 perform the register read/memory read stage 914; the execution cluster 960 perform the execute stage 916; 6) the memory unit 970 and the physical register file(s) unit(s) 958 perform the write back/memory write stage 918; 7) various units may be involved in the exception handling stage 922; and 8) the retirement unit 954 and the physical register file(s) unit(s) 958 perform the commit stage 924.

The core 990 may support one or more instructions sets (e.g., the x86 instruction set (with some extensions that have been added with newer versions); the MIPS instruction set of MIPS Technologies of Sunnyvale, CA; the ARM instruction set (with optional additional extensions such as NEON) of ARM Holdings of Sunnyvale, CA), including the instruction(s) described herein. In one embodiment, the core 990 includes logic to support a packed data instruction set extension (e.g., AVX1, AVX2), thereby allowing the operations used by many multimedia applications to be performed using packed data.

It should be understood that the core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyper-Threading technology).

While register renaming is described in the context of out-of-order execution, it should be understood that register renaming may be used in an in-order architecture. While the illustrated embodiment of the processor also includes separate instruction and data cache units 934/974 and a shared L2 cache unit 976, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor.

Specific Exemplary In-Order Core Architecture

Figure 10B:
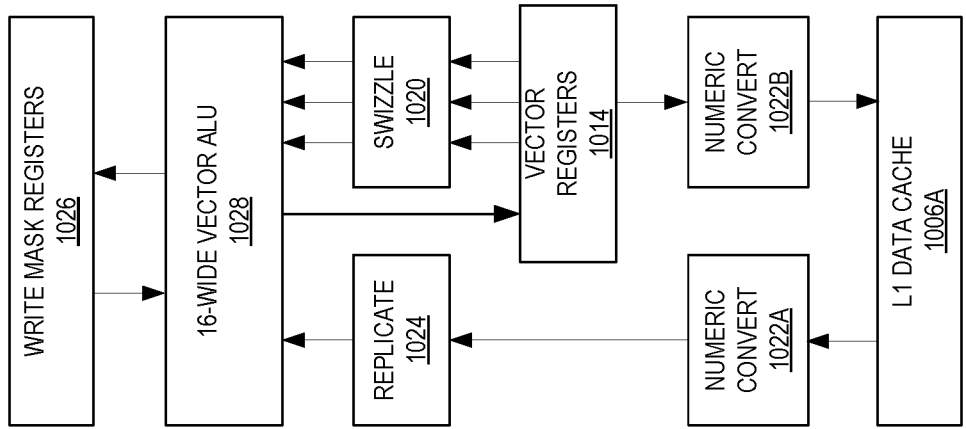
FIG. 10B is an expanded view of part of the processor core in FIG. 10A according to embodiments of the disclosure.
Figure 10A:
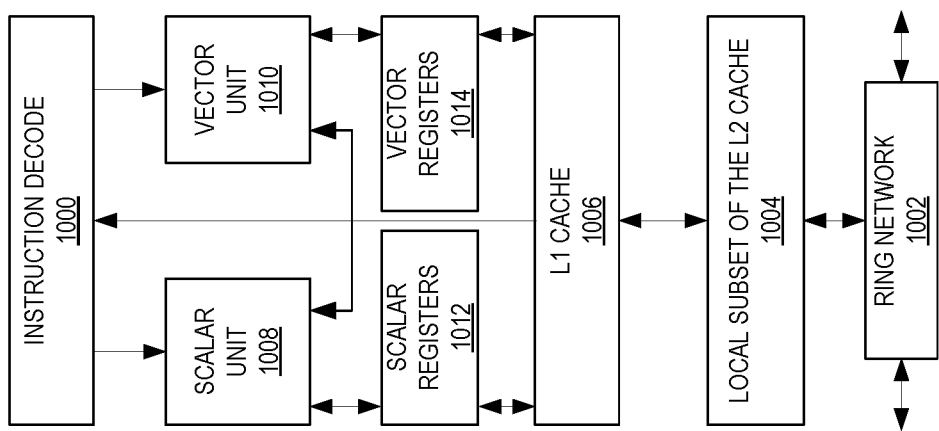
FIG. 10A is a block diagram of a single processor core, along with its connection to the on-die interconnect network and with its local subset of the Level 2 (L2) cache, according to embodiments of the disclosure.

FIGS. 10A-B illustrate a block diagram of a more specific exemplary in-order core architecture, which core would be one of several logic blocks (including other cores of the same type and/or different types) in a chip. The logic blocks communicate through a high-bandwidth interconnect network (e.g., a ring network) with some fixed function logic, memory I/O interfaces, and other necessary I/O logic, depending on the application.

FIG. 10A is a block diagram of a single processor core, along with its connection to the on-die interconnect network 1002 and with its local subset of the Level 2 (L2) cache 1004, according to embodiments of the disclosure. In one embodiment, an instruction decode unit 1000 supports the x86 instruction set with a packed data instruction set extension. An L1 cache 1006 allows low-latency accesses to cache memory into the scalar and vector units. While in one embodiment (to simplify the design), a scalar unit 1008 and a vector unit 1010 use separate register sets (respectively, scalar registers 1012 and vector registers 1014) and data transferred between them is written to memory and then read back in from a level 1 (L1) cache 1006, alternative embodiments of the disclosure may use a different approach (e.g., use a single register set or include a communication path that allow data to be transferred between the two register files without being written and read back).

The local subset of the L2 cache 1004 is part of a global L2 cache that is divided into separate local subsets, one per processor core. Each processor core has a direct access path to its own local subset of the L2 cache 1004. Data read by a processor core is stored in its L2 cache subset 1004 and can be accessed quickly, in parallel with other processor cores accessing their own local L2 cache subsets. Data written by a processor core is stored in its own L2 cache subset 1004 and is flushed from other subsets, if necessary. The ring network ensures coherency for shared data. The ring network is bi-directional to allow agents such as processor cores, L2 caches and other logic blocks to communicate with each other within the chip. Each ring data-path is 1012-bits wide per direction.

FIG. 10B is an expanded view of part of the processor core in FIG. 10A according to embodiments of the disclosure. FIG. 10B includes an L1 data cache 1006A part of the L1 cache 1004, as well as more detail regarding the vector unit 1010 and the vector registers 1014. Specifically, the vector unit 1010 is a 16-wide vector processing unit (VPU) (see the 16-wide ALU 1028), which executes one or more of integer, single-precision float, and double-precision float instructions. The VPU supports swizzling the register inputs with swizzle unit 1020, numeric conversion with numeric convert units 1022A-B, and replication with replication unit 1024 on the memory input. Write mask registers 1026 allow predicating resulting vector writes.

Figure 11:
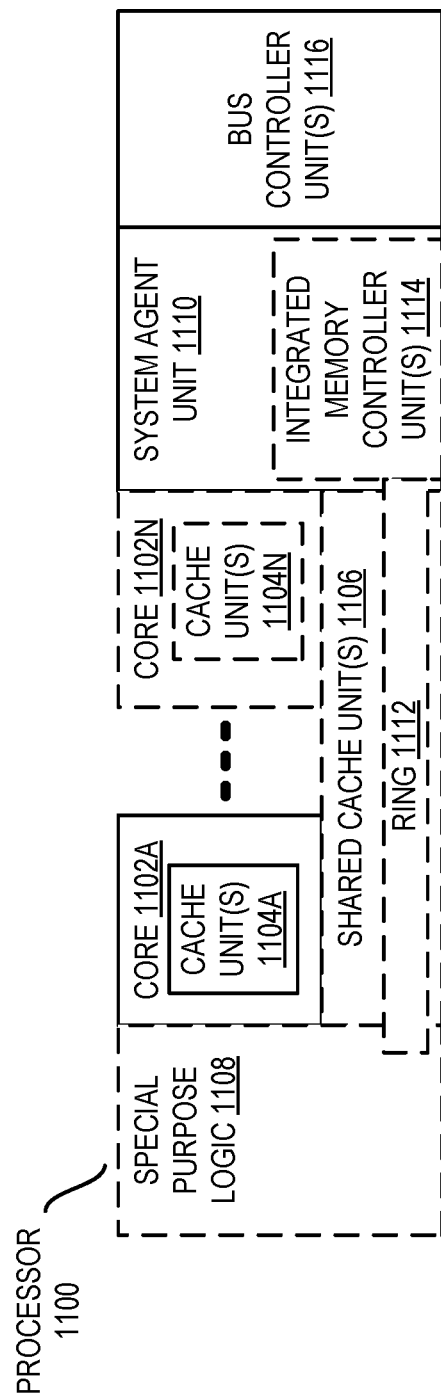
FIG. 11 is a block diagram of a processor that may have more than one core, may have an integrated memory controller, and may have integrated graphics according to embodiments of the disclosure.

FIG. 11 is a block diagram of a processor 1100 that may have more than one core, may have an integrated memory controller, and may have integrated graphics according to embodiments of the disclosure. The solid lined boxes in FIG. 11 illustrate a processor 1100 with a single core 1102A, a system agent 1110, a set of one or more bus controller units 1116, while the optional addition of the dashed lined boxes illustrates an alternative processor 1100 with multiple cores 1102A-N, a set of one or more integrated memory controller unit(s) 1114 in the system agent unit 1110, and special purpose logic 1108.

Thus, different implementations of the processor 1100 may include: 1) a CPU with the special purpose logic 1108 being integrated graphics and/or scientific (throughput) logic (which may include one or more cores), and the cores 1102A-N being one or more general purpose cores (e.g., general purpose in-order cores, general purpose out-of-order cores, a combination of the two); 2) a coprocessor with the cores 1102A-N being a large number of special purpose cores intended primarily for graphics and/or scientific (throughput); and 3) a coprocessor with the cores 1102A-N being a large number of general purpose in-order cores. Thus, the processor 1100 may be a general-purpose processor, coprocessor, or special-purpose processor, such as, for example, a network or communication processor, compression engine, graphics processor, GPGPU (general purpose graphics processing unit), a high-throughput many integrated core (MIC) coprocessor (including 30 or more cores), embedded processor, or the like. The processor may be implemented on one or more chips. The processor 1100 may be a part of and/or may be implemented on one or more substrates using any of a number of process technologies, such as, for example, BiCMOS, CMOS, or NMOS.

The memory hierarchy includes one or more levels of cache 1104A-N within the cores, a set or one or more shared cache units 1106, and external memory (not shown) coupled to the set of integrated memory controller units 1114. The set of shared cache units 1106 may include one or more mid-level caches, such as level 2 (L2), level 3 (L3), level 4 (L4), or other levels of cache, a last level cache (LLC), and/or combinations thereof. While in one embodiment a ring-based interconnect unit 1112 interconnects the integrated graphics logic 1108, the set of shared cache units 1106, and the system agent unit 1110/integrated memory controller unit(s) 1114, alternative embodiments may use any number of well-known techniques for interconnecting such units. In one embodiment, coherency is maintained between one or more cache units 1106 and cores 1102A-N.

In some embodiments, one or more of the cores 1102A-N are capable of multithreading. The system agent 1110 includes those components coordinating and operating cores 1102A-N. The system agent unit 1110 may include for example a power control unit (PCU) and a display unit. The PCU may be or include logic and components needed for regulating the power state of the cores 1102A-N and the integrated graphics logic 1108. The display unit is for driving one or more externally connected displays.

The cores 1102A-N may be homogenous or heterogeneous in terms of architecture instruction set; that is, two or more of the cores 1102A-N may be capable of execution the same instruction set, while others may be capable of executing only a subset of that instruction set or a different instruction set.

Exemplary Computer Architectures

FIGS. 12-15 are block diagrams of exemplary computer architectures. Other system designs and configurations known in the arts for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, handheld devices, and various other electronic devices, are also suitable. In general, a huge variety of systems or electronic devices capable of incorporating a processor and/or other execution logic as disclosed herein are generally suitable.

Figure 12:
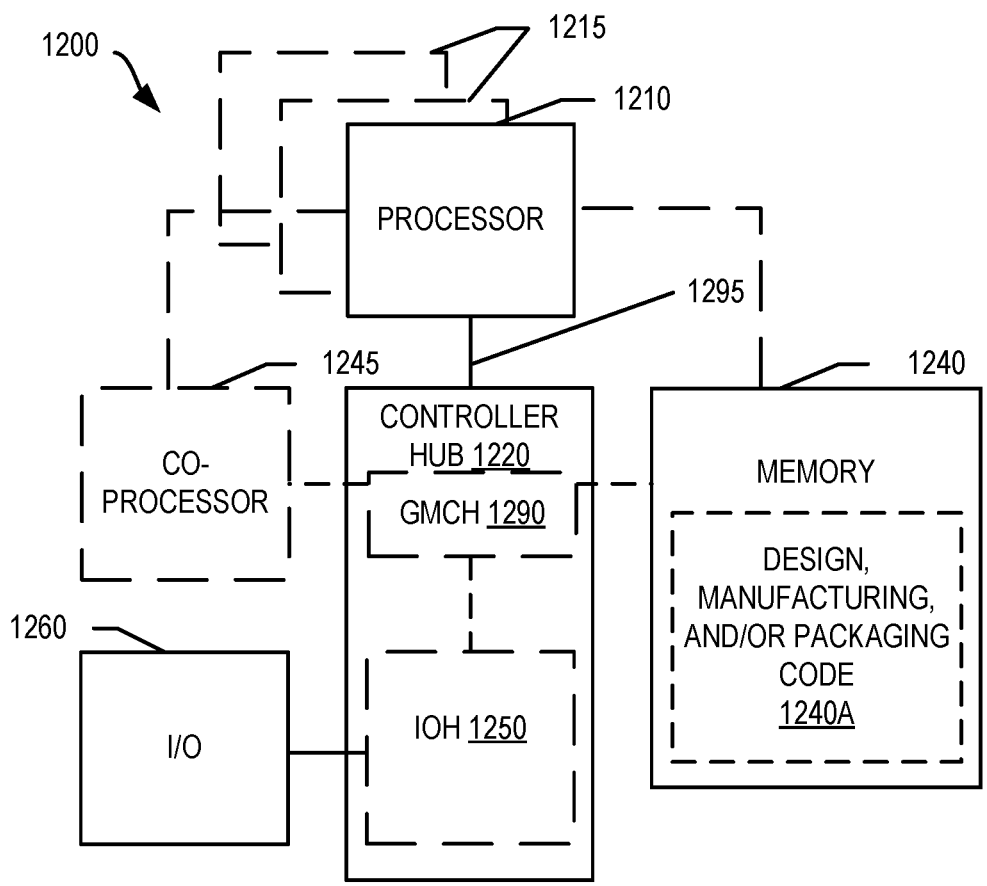
FIG. 12 is a block diagram of a system in accordance with one embodiment of the present disclosure.

Referring now to FIG. 12, shown is a block diagram of a system 1200 in accordance with one embodiment of the present disclosure. The system 1200 may include one or more processors 1210, 1215, which are coupled to a controller hub 1220. In one embodiment the controller hub 1220 includes a graphics memory controller hub (GMCH) 1290 and an Input/Output Hub (IOH) 1250 (which may be on separate chips); the GMCH 1290 includes memory and graphics controllers to which are coupled memory 1240 and a coprocessor 1245; the IOH 1250 couples input/output (I/O) devices 1260 to the GMCH 1290. Alternatively, one or both of the memory and graphics controllers are integrated within the processor (as described herein), the memory 1240 and the coprocessor 1245 are coupled directly to the processor 1210, and the controller hub 1220 in a single chip with the IOH 1250. Memory 1240 may include design, manufacturing, and/or packaging code 1240A, for example, that when executed causes a processor to perform any method of this disclosure.

The optional nature of additional processors 1215 is denoted in FIG. 12 with broken lines. Each processor 1210, 1215 may include one or more of the processing cores described herein and may be some version of the processor 1100.

The memory 1240 may be, for example, dynamic random-access memory (DRAM), phase change memory (PCM), or a combination of the two. For at least one embodiment, the controller hub 1220 communicates with the processor(s) 1210, 1215 via a multi-drop bus, such as a frontside bus (FSB), point-to-point interface such as Quickpath Interconnect (QPI), or similar connection 1295.

In one embodiment, the coprocessor 1245 is a special-purpose processor, such as, for example, a high-throughput MIC processor, a network or communication processor, compression engine, graphics processor, GPGPU, embedded processor, or the like. In one embodiment, controller hub 1220 may include an integrated graphics accelerator.

There can be a variety of differences between the physical resources 1210, 1215 in terms of a spectrum of metrics of merit including architectural, microarchitectural, thermal, power consumption characteristics, and the like.

In one embodiment, the processor 1210 executes instructions that control data processing operations of a general type. Embedded within the instructions may be coprocessor instructions. The processor 1210 recognizes these coprocessor instructions as being of a type that should be executed by the attached coprocessor 1245. Accordingly, the processor 1210 issues these coprocessor instructions (or control signals representing coprocessor instructions) on a coprocessor bus or other interconnect, to coprocessor 1245. Coprocessor(s) 1245 accept and execute the received coprocessor instructions.

Figure 13:
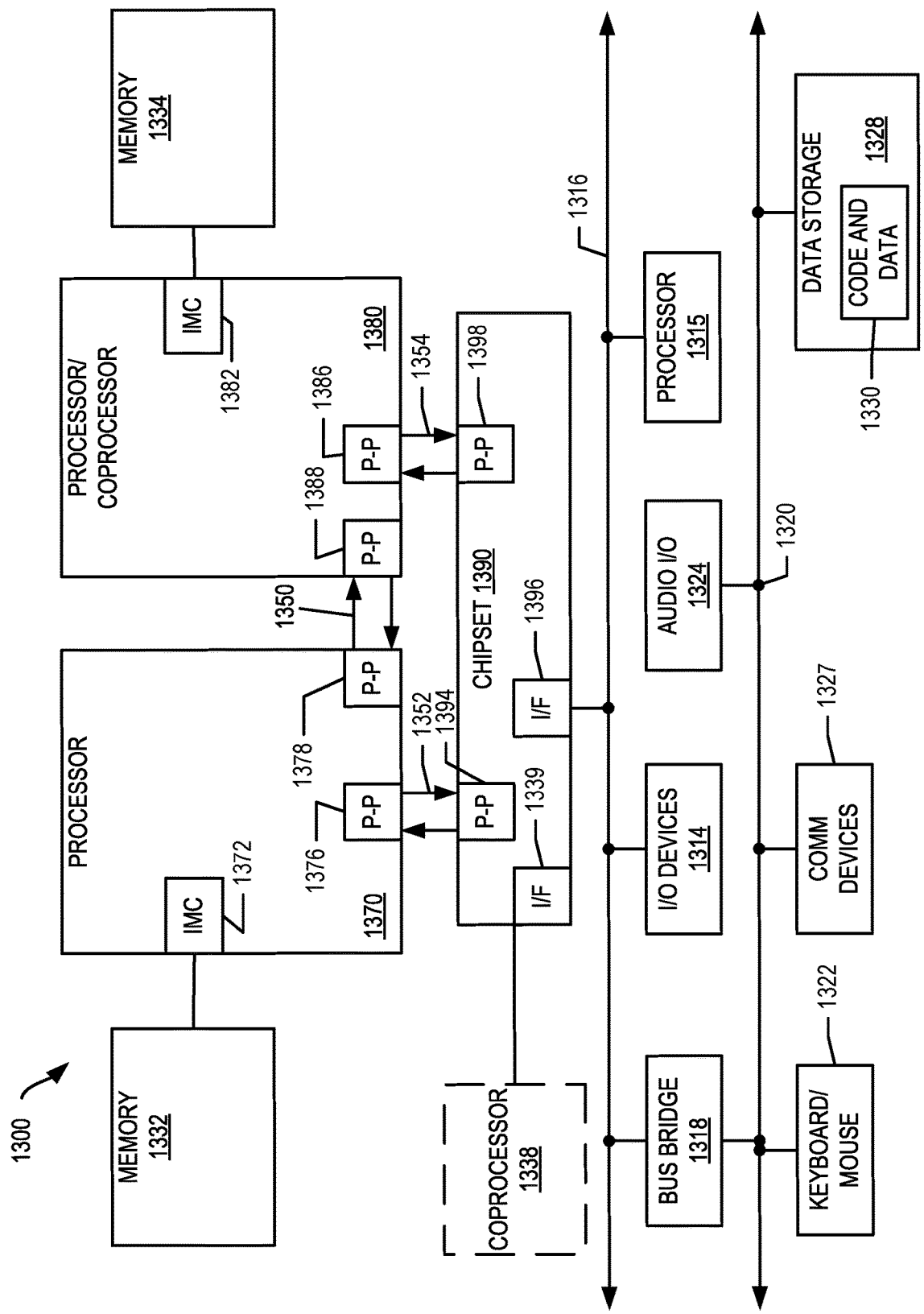
FIG. 13 is a block diagram of a more specific exemplary system in accordance with an embodiment of the present disclosure.

Referring now to FIG. 13, shown is a block diagram of a first more specific exemplary system 1300 in accordance with an embodiment of the present disclosure. As shown in FIG. 13, multiprocessor system 1300 is a point-to-point interconnect system, and includes a first processor 1370 and a second processor 1380 coupled via a point-to-point interconnect 1350. Each of processors 1370 and 1380 may be some version of the processor 1100. In one embodiment of the disclosure, processors 1370 and 1380 are respectively processors 1210 and 1215, while coprocessor 1338 is coprocessor 1245. In another embodiment, processors 1370 and 1380 are respectively processor 1210 coprocessor 1245.

Processors 1370 and 1380 are shown including integrated memory controller (IMC) units 1372 and 1382, respectively. Processor 1370 also includes as part of its bus controller units, point-to-point (P-P) interfaces 1376 and 1378; similarly, second processor 1380 includes P-P interfaces 1386 and 1388. Processors 1370, 1380 may exchange information via a point-to-point (P-P) interface 1350 using P-P interface circuits 1378, 1388. As shown in FIG. 13, IMCs 1372 and 1382 couple the processors to respective memories, namely a memory 1332 and a memory 1334, which may be portions of main memory locally attached to the respective processors.

Processors 1370, 1380 may each exchange information with a chipset 1390 via individual P-P interfaces 1352, 1354 using point to point interface circuits 1376, 1394, 1386, 1398. Chipset 1390 may optionally exchange information with the coprocessor 1338 via a high-performance interface 1339. In one embodiment, the coprocessor 1338 is a special-purpose processor, such as, for example, a high-throughput MIC processor, a network or communication processor, compression engine, graphics processor, GPGPU, embedded processor, or the like.

A shared cache (not shown) may be included in either processor or outside of both processors yet connected with the processors via P-P interconnect, such that either or both processors' local cache information may be stored in the shared cache if a processor is placed into a low power mode.

Chipset 1390 may be coupled to a first bus 1316 via an interface 1396. In one embodiment, first bus 1316 may be a Peripheral Component Interconnect (PCI) bus, or a bus such as a PCI Express bus or another third generation I/O interconnect bus, although the scope of the present disclosure is not so limited.

As shown in FIG. 13, various I/O devices 1314 may be coupled to first bus 1316, along with a bus bridge 1318 which couples first bus 1316 to a second bus 1320. In one embodiment, one or more additional processor(s) 1315, such as coprocessors, high-throughput MIC processors, GPGPU's, accelerators (such as, e.g., graphics accelerators or digital signal processing (DSP) units), field programmable gate arrays, or any other processor, are coupled to first bus 1316. In one embodiment, second bus 1320 may be a low pin count (LPC) bus. Various devices may be coupled to a second bus 1320 including, for example, a keyboard and/or mouse 1322, communication devices 1327 and a storage unit 1328 such as a disk drive or other mass storage device which may include instructions/code and data 1330, in one embodiment. Further, an audio I/O 1324 may be coupled to the second bus 1320. Note that other architectures are possible. For example, instead of the point-to-point architecture of FIG. 13, a system may implement a multi-drop bus or other such architecture.

Figure 14:
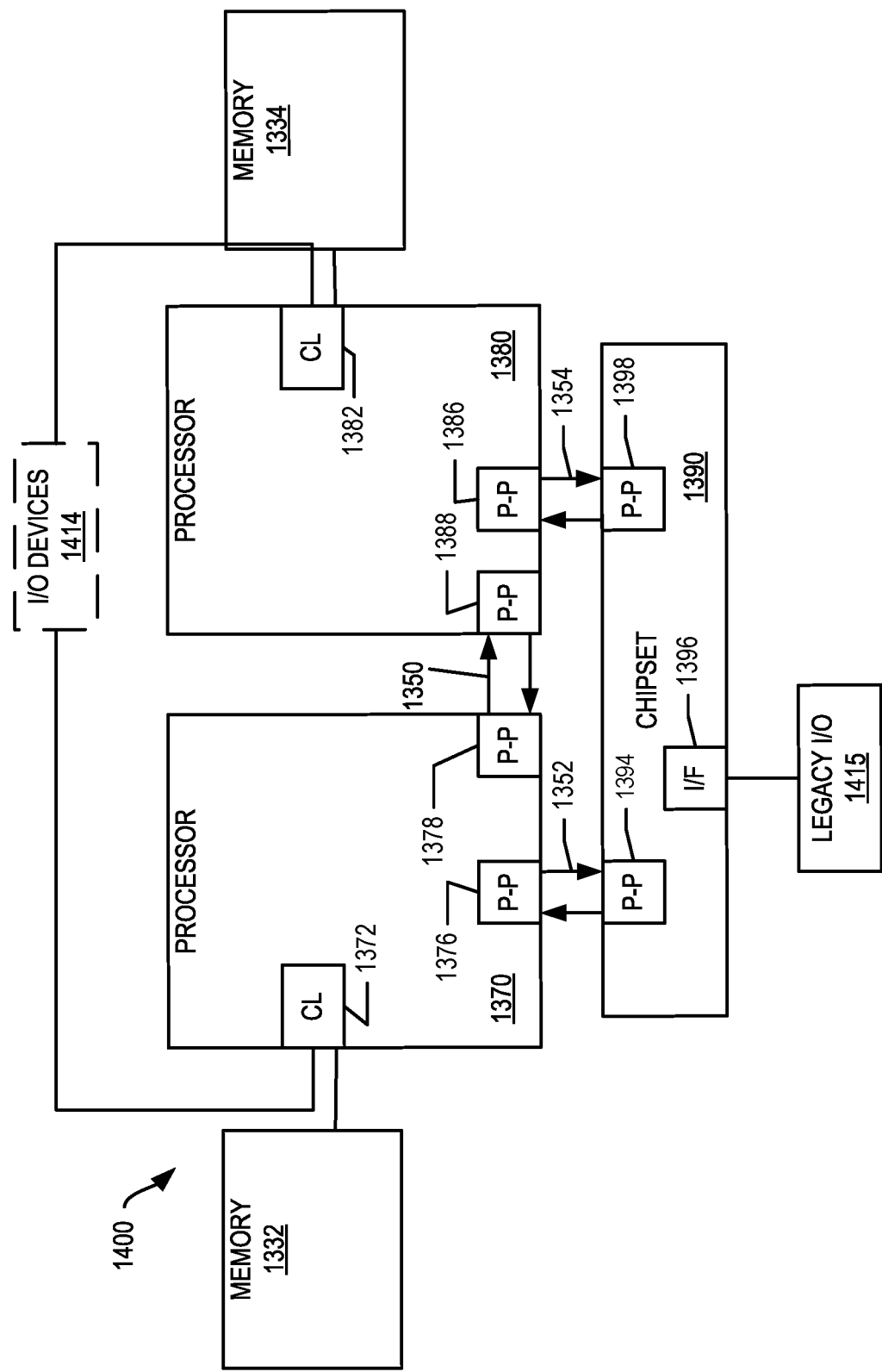
FIG. 14, shown is a block diagram of a second more specific exemplary system in accordance with an embodiment of the present disclosure.

Referring now to FIG. 14, shown is a block diagram of a second more specific exemplary system 1400 in accordance with an embodiment of the present disclosure. Like elements in FIGS. 13 and 14 bear like reference numerals, and certain aspects of FIG. 13 have been omitted from FIG. 14 in order to avoid obscuring other aspects of FIG. 14.

FIG. 14 illustrates that the processors 1370, 1380 may include integrated memory and I/O control logic ("CL") 1372 and 1382, respectively. Thus, the CL 1372, 1382 include integrated memory controller units and include I/O control logic. FIG. 14 illustrates that not only are the memories 1332, 1334 coupled to the CL 1372, 1382, but also that I/O devices 1414 are also coupled to the control logic 1372, 1382. Legacy I/O devices 1415 are coupled to the chipset 1390.

Figure 15:
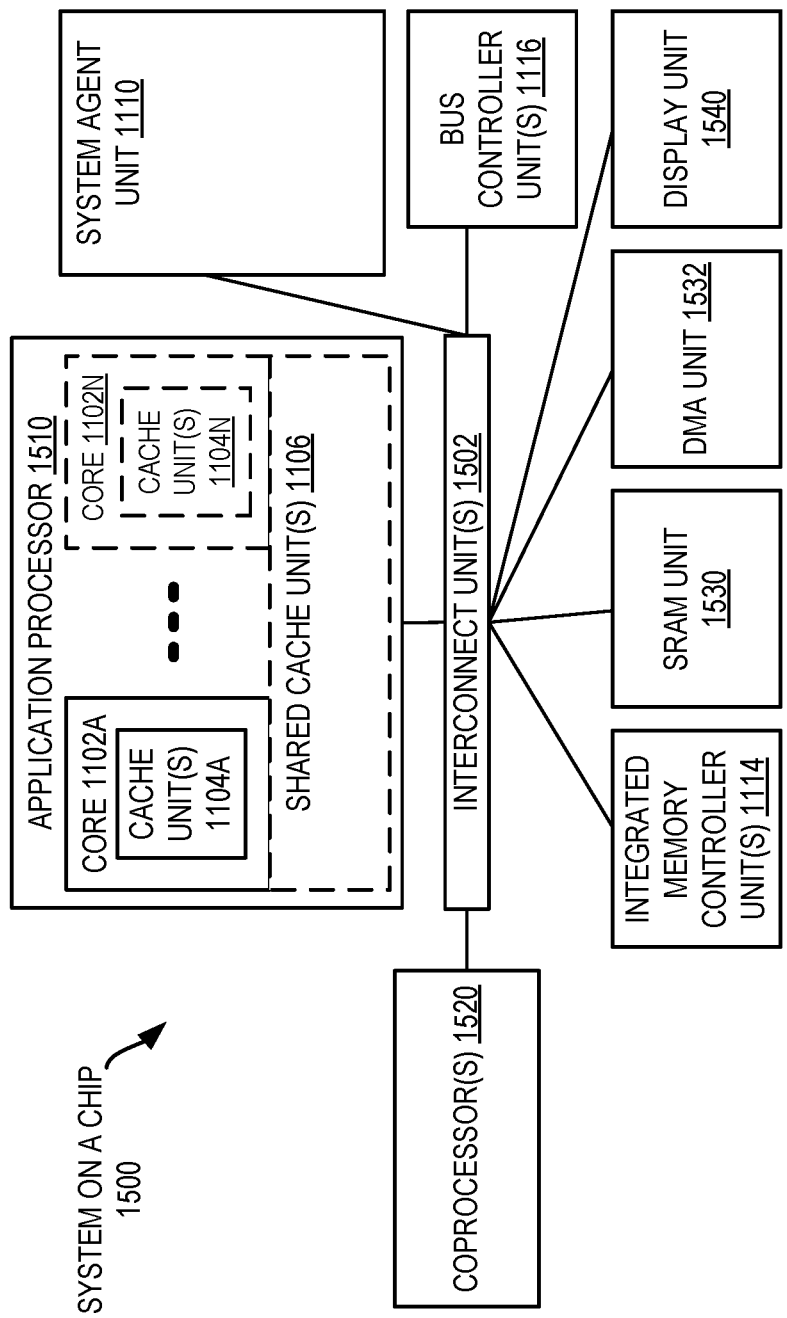
FIG. 15, shown is a block diagram of a system on a chip (SoC) in accordance with an embodiment of the present disclosure.

Referring now to FIG. 15, shown is a block diagram of a SoC 1500 in accordance with an embodiment of the present disclosure. Similar elements in FIG. 11 bear like reference numerals. Also, dashed lined boxes are optional features on more advanced SoCs. In FIG. 15, an interconnect unit(s) 1502 is coupled to: an application processor 1510 which includes a set of one or more cores 202A-N and shared cache unit(s) 1106; a system agent unit 1110; a bus controller unit(s) 1116; an integrated memory controller unit(s) 1114; a set or one or more coprocessors 1520 which may include integrated graphics logic, an image processor, an audio processor, and a video processor; an static random access memory (SRAM) unit 1530; a direct memory access (DMA) unit 1532; and a display unit 1540 for coupling to one or more external displays. In one embodiment, the coprocessor(s) 1520 include a special-purpose processor, such as, for example, a network or communication processor, compression engine, GPGPU, a high-throughput MIC processor, embedded processor, or the like.

Embodiments (e.g., of the mechanisms) disclosed herein may be implemented in hardware, software, firmware, or a combination of such implementation approaches. Embodiments of the disclosure may be implemented as computer programs or program code executing on programmable systems comprising at least one processor, a storage system (including volatile and non-volatile memory and/or storage elements), at least one input device, and at least one output device.

Program code, such as code 1330 illustrated in FIG. 13, may be applied to input instructions to perform the functions described herein and generate output information. The output information may be applied to one or more output devices, in known fashion. For purposes of this application, a processing system includes any system that has a processor, such as, for example, a digital signal processor (DSP), a microcontroller, an application specific integrated circuit (ASIC), or a microprocessor.

The program code may be implemented in a high-level procedural or object-oriented programming language to communicate with a processing system. The program code may also be implemented in assembly or machine language, if desired. In fact, the mechanisms described herein are not limited in scope to any particular programming language. In any case, the language may be a compiled or interpreted language.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Such machine-readable storage media may include, without limitation, non-transitory, tangible arrangements of articles manufactured or formed by a machine or device, including storage media such as hard disks, any other type of disk including floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), phase change memory (PCM), magnetic or optical cards, or any other type of media suitable for storing electronic instructions.

Accordingly, embodiments of the disclosure also include non-transitory, tangible machine-readable media containing instructions or containing design data, such as Hardware Description Language (HDL), which defines structures, circuits, apparatuses, processors and/or system features described herein. Such embodiments may also be referred to as program products.

Emulation (Including Binary Translation, Code Morphing, Etc.)

In some cases, an instruction converter may be used to convert an instruction from a source instruction set to a target instruction set. For example, the instruction converter may translate (e.g., using static binary translation, dynamic binary translation including dynamic compilation), morph, emulate, or otherwise convert an instruction to one or more other instructions to be processed by the core. The instruction converter may be implemented in software, hardware, firmware, or a combination thereof. The instruction converter may be on processor, off processor, or part on and part off processor.

Figure 16:
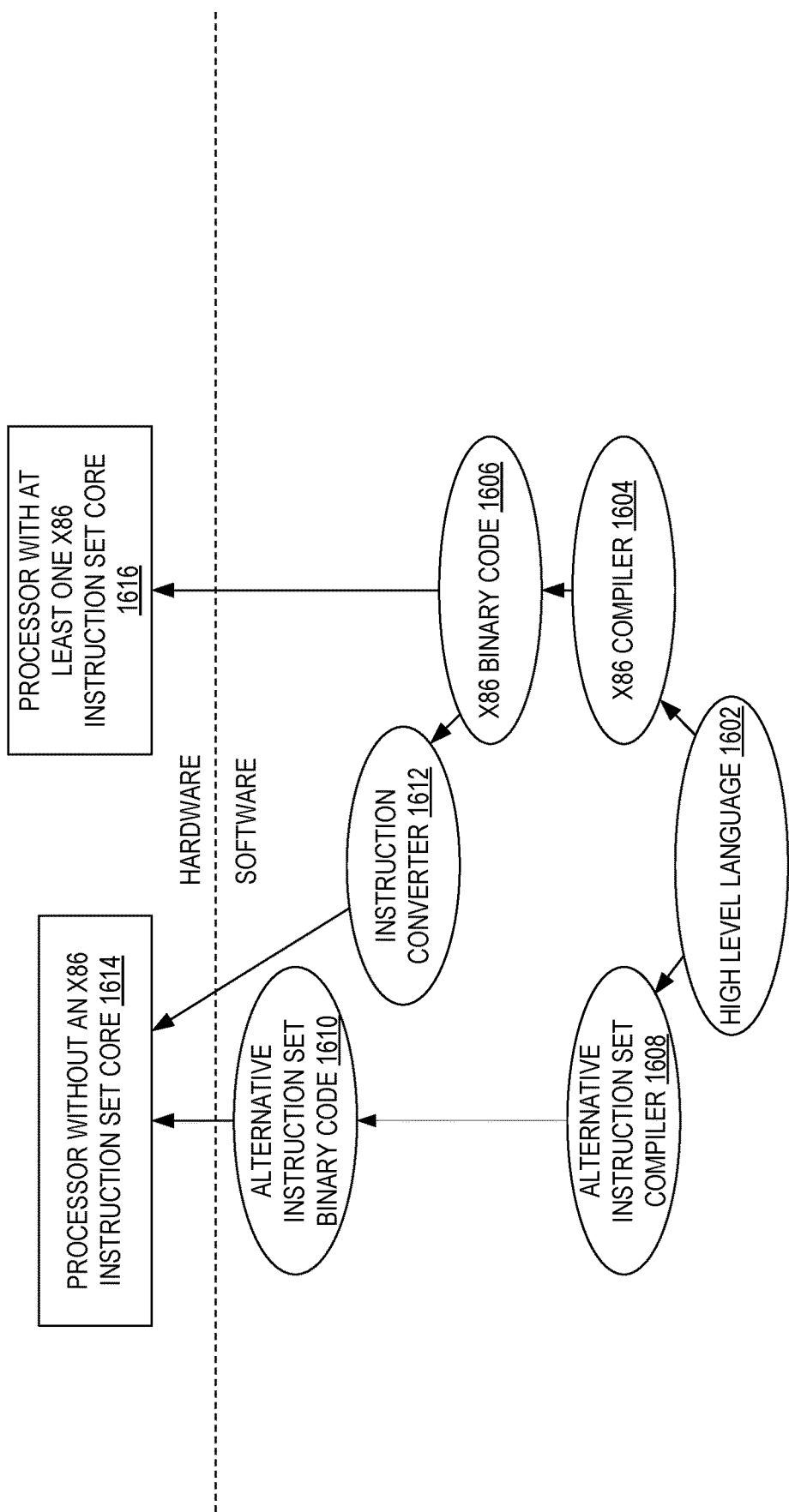
FIG. 16 is a block diagram contrasting the use of a software instruction converter to convert binary instructions in a source instruction set to binary instructions in a target instruction set according to embodiments of the disclosure.

FIG. 16 is a block diagram contrasting the use of a software instruction converter to convert binary instructions in a source instruction set to binary instructions in a target instruction set according to embodiments of the disclosure. In the illustrated embodiment, the instruction converter is a software instruction converter, although alternatively the instruction converter may be implemented in software, firmware, hardware, or various combinations thereof. FIG. 16 shows a program in a high-level language 1602 may be compiled using an x86 compiler 1604 to generate x86 binary code 1606 that may be natively executed by a processor with at least one x86 instruction set core 1616. The processor with at least one x86 instruction set core 1616 represents any processor that can perform substantially the same functions as an Intel® processor with at least one x86 instruction set core by compatibly executing or otherwise processing (1) a substantial portion of the instruction set of the Intel® x86 instruction set core or (2) object code versions of applications or other software targeted to run on an Intel® processor with at least one x86 instruction set core, in order to achieve substantially the same result as an Intel® processor with at least one x86 instruction set core. The x86 compiler 1604 represents a compiler that is operable to generate x86 binary code 1606 (e.g., object code) that can, with or without additional linkage processing, be executed on the processor with at least one x86 instruction set core 1616. Similarly, FIG. 16 shows the program in the high-level language 1602 may be compiled using an alternative instruction set compiler 1608 to generate alternative instruction set binary code 1610 that may be natively executed by a processor without at least one x86 instruction set core 1614 (e.g., a processor with cores that execute the MIPS instruction set of MIPS Technologies of Sunnyvale, CA and/or that execute the ARM instruction set of ARM Holdings of Sunnyvale, CA). The instruction converter 1612 is used to convert the x86 binary code 1606 into code that may be natively executed by the processor without an x86 instruction set core 1614. This converted code is not likely to be the same as the alternative instruction set binary code 1610 because an instruction converter capable of this is difficult to make; however, the converted code will accomplish the general operation and be made up of instructions from the alternative instruction set. Thus, the instruction converter 1612 represents software, firmware, hardware, or a combination thereof that, through emulation, simulation, or any other process, allows a processor or other electronic device that does not have an x86 instruction set processor or core to execute the x86 binary code 1606.

What is claimed is:

1. A system comprising:
a plurality of physically separate dies;
an interconnect to electrically couple the plurality of physically separate dies together;
a first die-to-die communication circuit, of a first die of the plurality of physically separate dies, comprising a transmitter circuit and an encryption circuit having a link key to encrypt data to be sent from the transmitter circuit into encrypted data; and
a second die-to-die communication circuit, of a second die of the plurality of physically separate dies, comprising a receiver circuit and a decryption circuit having the link key to decrypt the encrypted data sent from the transmitter circuit to the receiver circuit.

2. The system of claim 1, wherein each of the plurality of physically separate dies is provided the link key at manufacturing time.

3. The system of claim 1, wherein the first die and the second die are provided the link key at manufacturing time, and a different pair of physically separate dies is provided a different link key at manufacturing time.

4. The system of claim 1, wherein the link key is a chip identification key formed from a first chiplet identification value of the first die and a second chiplet identification value of the second die.

5. The system of claim 4, wherein the first die is to receive the second chiplet identification value of the second die on the interconnect, generate the chip identification key, and send the chip identification key to the second die on the interconnect.

6. The system of claim 4, wherein the first die-to-die communication circuit or the second die-to-die communication circuit is to check the chip identification key within the system against a chip identification key stored in a database for the system, and disable communication between the first die and the second die when the chip identification key within the system does not match the chip identification key stored in the database for the system.

7. The system of claim 1, wherein the second die-to-die communication circuit, of the second die of the plurality of physically separate dies, comprises a transmitter circuit and an encryption circuit having the link key to encrypt data to be sent from the transmitter circuit of the second die into encrypted data, and the first die-to-die communication circuit, of the first die of the plurality of physically separate dies, comprises a receiver circuit and a decryption circuit having the link key to decrypt the encrypted data sent from the transmitter circuit of the second die to the receiver circuit of the first die.

8. The system of claim 1, wherein the first die-to-die communication circuit is further to generate a tag for the encrypted data and send the tag with the encrypted data from the transmitter circuit, and the second die-to-die communication circuit is to decrypt the encrypted data sent from the transmitter circuit to the receiver circuit in response to an integrity check on the tag.

9. A method comprising:
electrically coupling a plurality of physically separate dies together with an interconnect into a system;
storing a link key into a first die-to-die communication circuit, of a first die of the plurality of physically separate dies, comprising a transmitter circuit and an encryption circuit using the link key to encrypt data to be sent from the transmitter circuit into encrypted data; and
storing the link key into a second die-to-die communication circuit, of a second die of the plurality of physically separate dies, comprising a receiver circuit and a decryption circuit using the link key to decrypt the encrypted data sent from the transmitter circuit to the receiver circuit.

10. The method of claim 9, wherein the storing the link key in each of the plurality of physically separate dies is at manufacturing time of the system.

11. The method of claim 9, wherein the storing of the link key in the first die and the second die is at manufacturing time, and further comprising storing a different link key in a different pair of physically separate dies of the system at manufacturing time.

12. The method of claim 9, further comprises forming a chip identification key from a first chiplet identification value of the first die and a second chiplet identification value of the second die, and providing the chip identification key as the link key.

13. The method of claim 12, further comprising:
receiving the second chiplet identification value of the second die at the first die on the interconnect, wherein the forming of the chip identification key is by the first die; and
sending the chip identification key from the first die to the second die on the interconnect.

14. The method of claim 12, further comprising:
checking the chip identification key within the system against a chip identification key stored in a database for the system; and
disabling communication between the first die and the second die when the chip identification key within the system does not match the chip identification key stored in the database for the system.

15. The method of claim 9, wherein the second die-to-die communication circuit, of the second die of the plurality of physically separate dies, comprises a transmitter circuit and an encryption circuit using the link key to encrypt data to be sent from the transmitter circuit of the second die into encrypted data, and the first die-to-die communication circuit, of the first die of the plurality of physically separate dies, comprises a receiver circuit and a decryption circuit using the link key to decrypt the encrypted data sent from the transmitter circuit of the second die to the receiver circuit of the first die.

16. The method of claim 9, further comprising:
generating a tag for the encrypted data by the first die-to-die communication circuit; and
sending the tag with the encrypted data from the transmitter circuit of the first die-to-die communication circuit, wherein the second die-to-die communication circuit decrypts the encrypted data sent from the transmitter circuit to the receiver circuit in response to an integrity check on the tag.

17. A system on a chip comprising:
a plurality of physically separate chiplets;
an interconnect to electrically couple the plurality of physically separate chiplets together;
a first chiplet-to-chiplet communication circuit, of a first chiplet of the plurality of physically separate chiplets, comprising a transmitter circuit and an encryption circuit having a link key to encrypt data to be sent from the transmitter circuit into encrypted data; and
a second chiplet-to-chiplet communication circuit, of a second chiplet of the plurality of physically separate chiplets, comprising a receiver circuit and a decryption circuit having the link key to decrypt the encrypted data sent from the transmitter circuit to the receiver circuit.

18. The system on a chip of claim 17, wherein each of the plurality of physically separate chiplets is provided the link key at manufacturing time.

19. The system on a chip of claim 17, wherein the first chiplet and the second chiplet are provided the link key at manufacturing time, and a different pair of physically separate chiplets is provided a different link key at manufacturing time.

20. The system on a chip of claim 17, wherein the link key is a chip identification key formed from a first chiplet identification value of the first chiplet and a second chiplet identification value of the second chiplet.

21. The system on a chip of claim 20, wherein the first chiplet is to receive the second chiplet identification value of the second chiplet on the interconnect, generate the chip identification key, and send the chip identification key to the second chiplet on the interconnect.

22. The system on a chip of claim 20, wherein the first chiplet-to-chiplet communication circuit or the second chiplet-to-chiplet communication circuit is to check the chip identification key within the system on a chip against a chip identification key stored in a database for the system on a chip, and disable communication between the first chiplet and the second chiplet when the chip identification key within the system on a chip does not match the chip identification key stored in the database for the system on a chip.

23. The system on a chip of claim 17, wherein the second chiplet-to-chiplet communication circuit, of the second chiplet of the plurality of physically separate chiplets, comprises a transmitter circuit and an encryption circuit having the link key to encrypt data to be sent from the transmitter circuit of the second chiplet into encrypted data, and the first chiplet-to-chiplet communication circuit, of the first chiplet of the plurality of physically separate chiplets, comprises a receiver circuit and a decryption circuit having the link key to decrypt the encrypted data sent from the transmitter circuit of the second chiplet to the receiver circuit of the first chiplet.

24. The system on a chip of claim 17, wherein the first chiplet-to-chiplet communication circuit is further to generate a tag for the encrypted data and send the tag with the encrypted data from the transmitter circuit, and the second chiplet-to-chiplet communication circuit is to decrypt the encrypted data sent from the transmitter circuit to the receiver circuit in response to an integrity check on the tag.

* * * * *